US011427025B2

(12) United States Patent
Mimita et al.

(10) Patent No.: US 11,427,025 B2
(45) Date of Patent: Aug. 30, 2022

(54) DISPLAY, ARTICLE WITH DISPLAY, AND METHOD OF OBSERVING DISPLAY

(71) Applicant: TOPPAN PRINTING CO., LTD., Tokyo (JP)

(72) Inventors: Naomichi Mimita, Tokyo (JP); Mizuki Yanagimoto, Tokyo (JP); Yuko Masunaga, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 319 days.

(21) Appl. No.: 15/953,676

(22) Filed: Apr. 16, 2018

(65) Prior Publication Data
US 2018/0229535 A1    Aug. 16, 2018

Related U.S. Application Data

(63) Continuation of application No. PCT/JP2016/004591, filed on Oct. 14, 2016.

(30) Foreign Application Priority Data

Oct. 19, 2015  (JP) .............................. JP2015-205770

(51) Int. Cl.
*G02B 5/18*     (2006.01)
*G09F 3/03*     (2006.01)
(Continued)

(52) U.S. Cl.
CPC ........... *B42D 25/328* (2014.10); *B42D 25/29* (2014.10); *B42D 25/324* (2014.10); *G02B 5/18* (2013.01);
(Continued)

(58) Field of Classification Search
None
See application file for complete search history.

(56) References Cited

U.S. PATENT DOCUMENTS 8,035,121 B2 * 10/2011 Park ........................ F21V 5/04
257/98
2009/0190458 A1 * 7/2009 Nashi .................. G02B 5/1861
369/112.03
(Continued)

FOREIGN PATENT DOCUMENTS

DE    102012105571 A1    1/2014
EP    2 508 922 A1    10/2012
(Continued)

OTHER PUBLICATIONS

International Search Report with English language translation and Written Opinion issued in International Application No. PCT/JP2016/004591 dated Jan. 10, 2017.
(Continued)

*Primary Examiner* — Christopher Stanford
*Assistant Examiner* — Journey F Sumlar
(74) *Attorney, Agent, or Firm* — Foley & Lardner LLP

(57) ABSTRACT

A display that exhibits improved anti-counterfeiting effects. The display includes an uneven-structure-forming layer having an uneven structure on one surface and a reflecting layer that covers at least part of an unevenly structured surface. In the display, the uneven-structure-forming layer includes a first region group including a plurality of first regions, each first region including a flat part and a plurality of convexities or a plurality of concavities, the top surface of each of the convexities or the bottom surface of each of the concavities is substantially parallel to a surface of the flat part; distances between the centers of adjacent convexities or concavities are not equal; the convexities have a uniform height, or the concavities have a uniform depth; the first region group is formed, with the first regions arrayed inside at a regular pitch.

14 Claims, 18 Drawing Sheets

(51) Int. Cl.

| | | |
|---|---|---|
| *B42D 25/328* | (2014.01) | |
| *G09F 3/02* | (2006.01) | |
| *G09F 19/12* | (2006.01) | |
| *B42D 25/324* | (2014.01) | |
| *B42D 25/29* | (2014.01) | |
| *B42D 25/373* | (2014.01) | |
| *B42D 25/378* | (2014.01) | |
| *B42D 25/465* | (2014.01) | |
| *B44F 1/14* | (2006.01) | |

(52) U.S. Cl.
CPC ......... *G02B 5/1842* (2013.01); *G02B 5/1861* (2013.01); *G09F 3/02* (2013.01); *G09F 3/0376* (2013.01); *G09F 19/12* (2013.01); *B42D 25/373* (2014.10); *B42D 25/378* (2014.10); *B42D 25/465* (2014.10); *B44F 1/14* (2013.01)

(56) References Cited

U.S. PATENT DOCUMENTS

| | | | |
|---|---|---|---|
| 2013/0169940 A1* | 7/2013 | Takanokura | G02B 5/1842 353/31 |
| 2015/0042702 A1 | 2/2015 | Jiang et al. | |
| 2015/0219807 A1 | 8/2015 | Lochbihler | |
| 2015/0192897 A1 | 9/2015 | Schilling et al. | |

FOREIGN PATENT DOCUMENTS

| | | |
|---|---|---|
| EP | 2 960 690 A1 | 12/2015 |
| JP | H04-136810 A | 5/1992 |
| JP | 2010-204348 A | 9/2010 |
| JP | 2011-123267 A | 6/2011 |
| JP | 2011-218648 A | 11/2011 |
| JP | 2012-078447 A | 4/2012 |
| JP | 4-983899 B2 | 7/2012 |
| JP | 4-983948 B2 | 7/2012 |
| JP | 2012-230183 | 11/2012 |
| JP | 5-143855 B2 | 2/2013 |
| JP | 2013-193268 A | 9/2013 |
| JP | 5-570210 B2 | 8/2014 |
| WO | WO-2008/074306 A1 | 6/2008 |
| WO | WO-2014/001283 A1 | 1/2014 |
| WO | WO-2014/023415 A1 | 2/2014 |
| WO | WO-2014/129202 A1 | 8/2014 |

OTHER PUBLICATIONS

Supplementary European Search Report regarding Application No. EP 16857092.7, dated Sep. 5, 2018, 6 pps.
"PIXEL"—Wikipedia—https://de.wikipedia.org/wiki/Pixel.
Notice of Opposition dated Sep. 22, 2020 for corresponding European Patent Application 16857092.7.
Notice of Opposition, dated Aug. 13, 2021, issued in corresponding European Patent Application No. 19185168.2 (25 pages).

* cited by examiner

DISPLAY, ARTICLE WITH DISPLAY, AND METHOD OF OBSERVING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/004591, filed on Oct. 14, 2016, which is based upon and claims the benefit of priority to Japan Priority Application No. 2015-205770, filed on Oct. 19, 2015, the disclosures of which are all hereby incorporated herein by reference in their entireties.

TECHNICAL FIELD

The present invention relates to a display that provides anti-counterfeiting, decorative, and/or aesthetic effects. More particularly, the present invention relates to a display that provides anti-counterfeiting effects applicable to security devices for paper currencies, identifications (IDs), and brand protection (BP).

BACKGROUND OF THE INVENTION

Valuable stock certificates, such as gift tickets or checks, cards, such as credit cards, cash cards, or ID cards, and certificates, such as passports or driver's licenses, are each typically adhered with a display having visual effects different from those of a normal printed object to prevent counterfeiting of these articles. Circulation of counterfeit articles besides certificates is also becoming a social problem in recent years. Therefore, there are increasing opportunities of applying similar anti-counterfeiting technique to such articles as well.

Known displays having visual effects different from those of normal printed objects include, for example, a display provided with a diffraction grating (PTL 1). Depending on the observation angle, the wavelength of diffracted light reaching the observer's eyes varies. With this variation, the observer recognizes iridescent change in a display color.

Also known is a display that scatters illumination light and displays a color with high chroma by virtue of a fine uneven structure (PTLs 2 to 5). This display is characterized in that a color change is prevented from being displayed which is observed in a display having a diffraction grating.

CITATION LIST

Patent Literature [PTL 1] JPAH04-136810; [PTL 2] JP4983899; [PTL 3] JP4983948; [PTL 4] JP5143855; [PTL 5] JP5570210

SUMMARY OF THE INVENTION

Technical Problem

However, under circumstances that every article needing measures for preventing counterfeiting uses the above technique, this technique has come to be widely known. Therefore, a display with improved anti-counterfeiting effects is still sought.

The present invention aims to provide a display that exhibits improved anti-counterfeiting effects and an article with the display.

Solution to Problem

The present invention relates to a display including an uneven-structure-forming layer having an uneven structure on one surface thereof and a reflecting layer that covers at least part of an unevenly structured surface of the uneven-structure-forming layer. In the display, the uneven-structure-forming layer includes a first region group including a plurality of first regions, each first region including a flat part and a plurality of convexities or a plurality of concavities, the top surface of the convexities or the bottom surface of the concavities is substantially parallel to a surface of the flat part; distances between the centers of adjacent convexities or concavities are not equal, the convexities have a uniform height, or the concavities have a uniform depth; and the first region group is formed, with the first regions arrayed inside at a regular pitch.

The present invention encompasses an article with a display, the article being provided with the display described above and an article that carries the display.

The present invention further relates to an observing method of a display using a point light source to observe a display including an uneven-structure-forming layer having an uneven structure on one surface and a reflecting layer that covers at least part of an unevenly structured surface of the uneven-structure-forming layer, In the display, the uneven-structure-forming layer includes a first region group including a plurality of first regions, each first region including a flat part and a plurality of convexities or a plurality of concavities, the top surface of the convexities or the bottom surface of the concavities is substantially parallel to the surface of the flat part; distances between the centers of adjacent convexities or concavities are not equal; the convexities have a uniform height, or the concavities have a uniform depth; and the first region group is formed, with the first regions arrayed inside at a pitch of 1 μm-100 μm.

The present invention further relates to an observation method using a laser light to observe a display including an uneven-structure-forming layer having an uneven structure on one surface and a reflecting layer that covers at least part of an unevenly structured surface of the uneven-structure-forming layer. In the display, the uneven-structure-forming layer includes a first region group including a plurality of first regions, each first region including a flat part and a plurality of convexities or a plurality of concavities, the top surface of the convexities or the bottom surface of the concavities is substantially parallel to the surface of the flat part; distances between the centers of adjacent convexities or concavities are not equal; the convexities have a uniform height, or the concavities have a uniform depth; and the first region group is formed, with the first regions arrayed inside at a pitch of 1 μm-300 μm.

Advantageous Effects of the Invention

The display and the article with the display of the present invention produces a color change due to a periodic structure according to the change of an observation angle (hereinafter also referred to as "iridescent change due to a periodic structure"), and displays a color with high chroma by virtue of the scattered light (hereinafter also referred to as "structural color by virtue of the scattered light" or "structural color"). The display and the article thereby exhibit improved anti-counterfeiting effects than conventional ones.

DESCRIPTION OF THE REPRESENTATIVE EMBODIMENTS

Figure 1A:
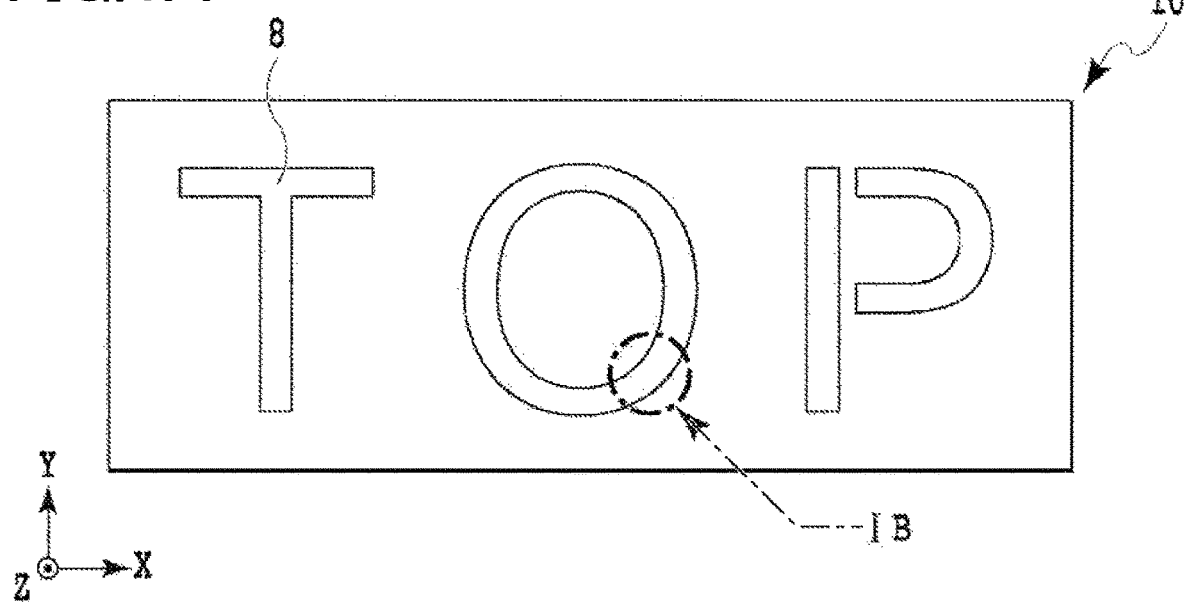
FIG. 1A is a schematic plan view illustrating an example of a display according to the present invention.

The embodiments of the present invention will be described in detail. In the following description, reference will be made to the drawings as appropriate, but embodiments illustrated in the drawings are examples of the present invention. It will be understood that the embodiments discussed below are intended to be representative of the present invention. The present invention is not limited to these aspects. Note that identical reference signs are given to components that exhibit an identical or similar function, thereby omitting repetitive description on occasions. Also note that a scale ratio in each drawing is exaggerated for convenience of description and may possibly differ from an actual ratio. Further, in the present specification, a "-" sign means that a lower limit value and an upper limit value before and after the sign are inclusive.

<Display>

The display according to the present invention includes an uneven-structure-forming layer having an uneven structure on one surface thereof and a reflecting layer that covers at least part of an unevenly structured surface of the uneven-structure-forming layer. The uneven-structure-forming layer has a first region group constituted by a plurality of first regions and has a specific uneven structure in the first region. The first regions are regularly arranged at a regular pitch.

Figure 1B:
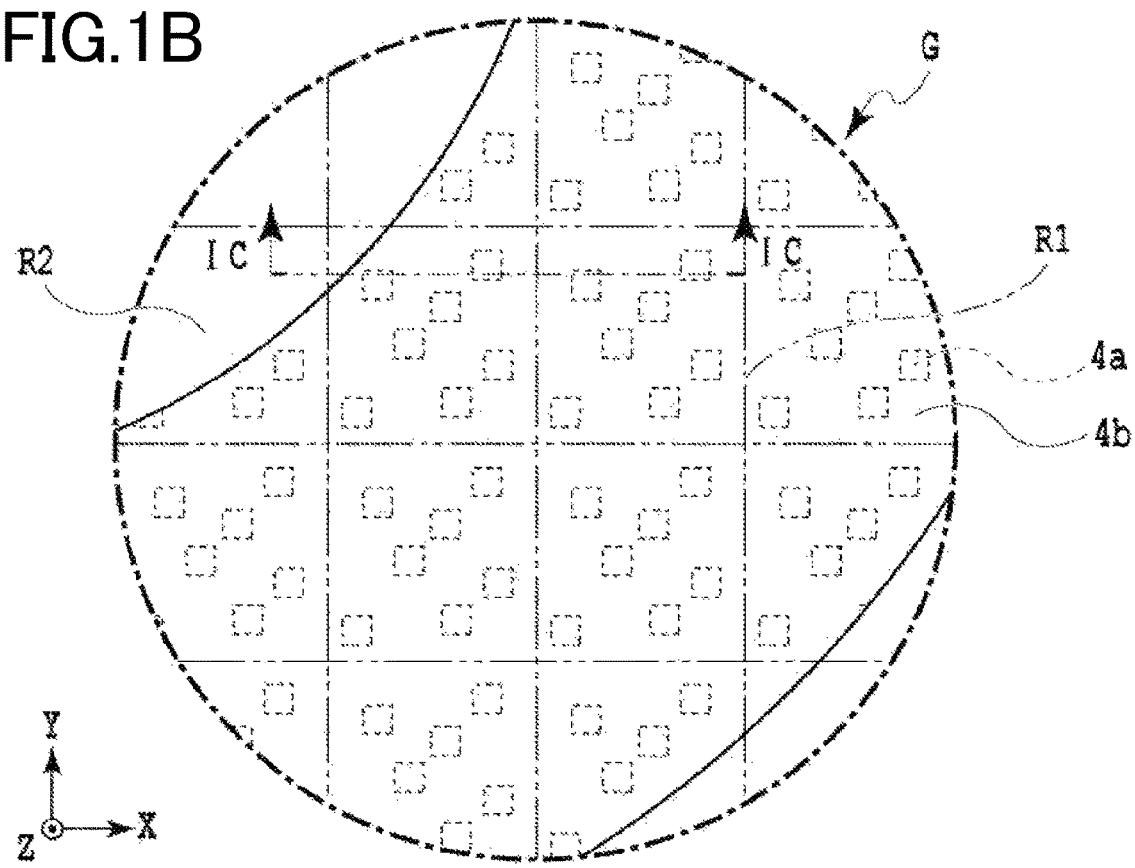
FIG. 1B is an enlarged view of a part circled by the dash-dot line shown in FIG. 1A.
Figure 1C:
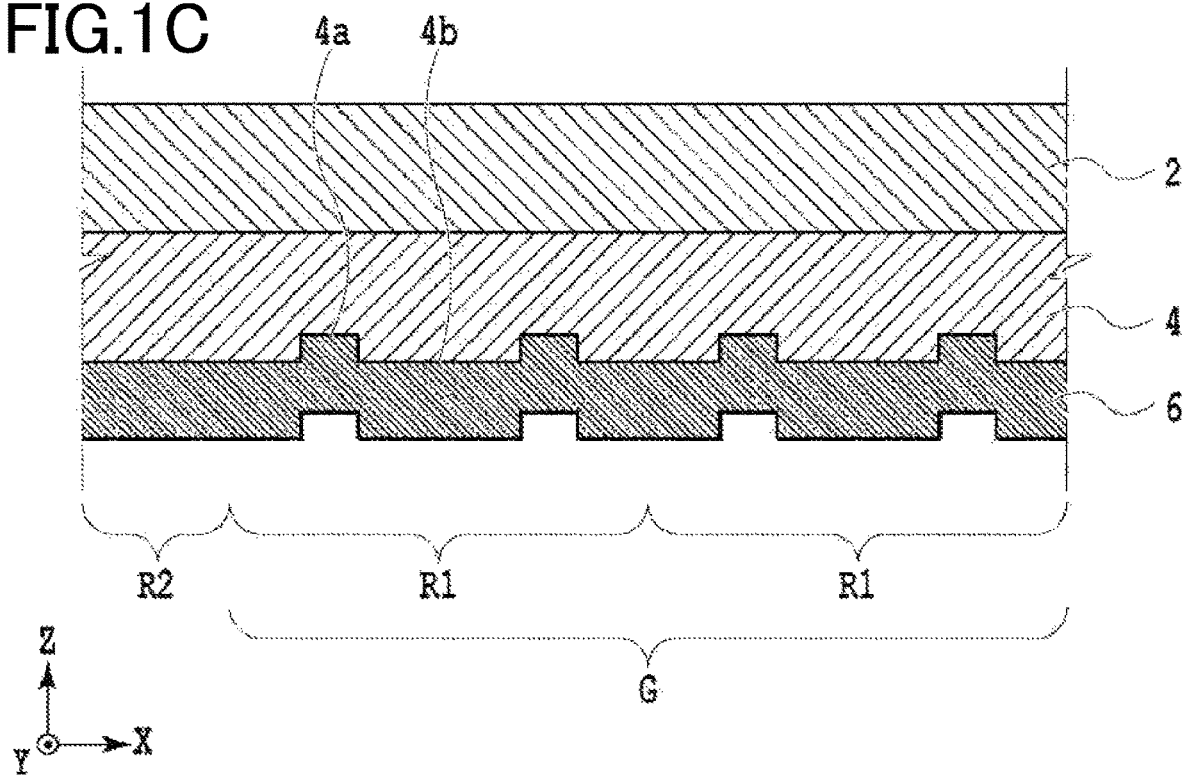
FIG. 1C is a cross-sectional view taken along the line IC-IC shown in FIG. 1B.

FIG. 1A is a plan view schematically illustrating an example of a display according to the present invention. FIG. 1B is an enlarged view of a part circled by the dash-dot line shown in FIG. 1A. FIG. 2B is a cross-sectional view taken along the line IC-IC shown in FIG. 1B. In FIGS. 1A to 1C, the X direction and the Y direction are parallel to a display surface, while being perpendicular to each other. Further, the Z direction is perpendicular to the X and Y directions.

The display according to the present invention includes an uneven-structure-forming layer having an uneven structure on one surface thereof and a reflecting layer that covers at least part of an unevenly structured surface of the uneven-structure-forming layer. The display in the example shown in FIG. 1C includes a substrate 2, an uneven-structure-forming layer 4, which has a concavity structure on a surface opposite to the substrate 2, and a reflecting layer 6, which covers the concavity surface of the uneven-structure-forming layer 4. In this example, a substrate 2 side serves as a front side (observer side), and a reflecting layer 6 side serves as a rear side. In the present invention, the uneven-structure-forming layer 4 may be provided with a convexity structure (convexities) in place of the concavity structure (concavities). Whether to form (concavities) or convexities depends on the surface where the uneven structure is formed. Forming recesses on the surface produces a concavity structure (concavities), while providing projections on the surface produces a convexity structure (convexities). Components of a display 10 will be described below.

(Substrate 2)

A substrate 2 has light transmission properties. The substrate 2 is typically transparent and, in particular, colorless and transparent. Examples of the material that can be used as the substrate 2 include a relatively highly heat-resistant resin such as polyethylene terephthalate (PET) and polycarbonate (PC).

The substrate 2 may be a film or sheet that can be used alone. The substrate 2 serves as a base of the uneven-structure-forming layer 4 while protecting the uneven-structure-forming layer 4. The substrate 2 can be omitted.

(Uneven-Structure-Forming Layer 4)

The uneven-structure-forming layer 4 is permeable to light. The uneven-structure-forming layer 4 is typically transparent and, in particular, colorless and transparent.

The uneven-structure-forming layer 4 has a first region group G constituted by a plurality of first regions R1 and has an uneven structure in each first region R1. The uneven structure includes a flat part and a plurality of convexities or a plurality of concavities. In the example shown in FIG. 1C, a flat part 4b is provided so as to fill the space between each of the plurality of concavities 4a. The first region group G may have a flat region F as in the example shown in FIG. 11.

The uneven-structure-forming layer 4 may have a second region R2, which has a structure different from that of uneven structure in the first region R1. The structure of the second region R2 is not particularly limited as long as it is different from the uneven structure in the first region R1. Examples of the structure of the second region R2 include a diffraction grating, a scattering structure, a light-absorbent moth eye structure, a structure in which a light-absorbent moth-eye structure and a light diffraction structure are combined, or a flat structure. When a diffraction grating is provided in the second region R2, the diffraction grating will be observed at an angle different from the angle of observing the uneven structure in the first region R1. This configuration can produce a display that provides a different image according to observation angles. Instead of or in addition to the diffraction grating, a scattering structure may be provided in the second region R2. Providing the scattering structure reduces (decreases) the chroma of the uneven structure in the first region R1, that is, the chroma can be controlled according to an area ratio between the scattering structure and the uneven structure. In the example shown in FIG. 1C, the first region group G includes an uneven structure having the flat part 4b and the concavities 4a in the first region R1, and has a flat structure in the second region R2.

Details of the uneven structure in the first region R1 of the uneven-structure-forming layer 4 will be described later in the section "Uneven structure in a first region R1 of the uneven-structure-forming layer 4".

Examples of the material that can be used as the uneven-structure-forming layer 4 include a thermoplastic resin or a photo curable resin.

(Reflecting Layer 6)

The reflecting layer 6 serves as a layer that reflects light.

The reflecting layer 6 covers at least part of the surface on which the uneven structure of the uneven-structure-forming layer 4 is provided. As will be described later, a structural color is produced by reflection of light from the uneven structure of the uneven-structure-forming layer 4; hence the reflecting layer 6 preferably covers a region that displays the structural color. From this point of view, it is preferred that the reflecting layer 6 covers a whole region where the uneven structure is formed when the region that displays the structural color agrees with the region where the uneven structure is formed. When the region that displays the structural color serves as part of the region where the uneven structure is formed, however, it is preferred that the reflecting layer 6 covers part of the region. As in the example shown in FIG. 6, when the concavities 4a are disposed in part of the first region R1, the reflecting layer 6 does not necessarily have to be provided in the flat part 4b at the right end of the first region R1, which is assumed not to participate in displaying the structural color. Further, as in the example shown in FIG. 11, when the first region group G includes a flat region F, the reflecting layer 6 does not necessarily have to be provided in the flat region F. Thus, providing the reflecting layer 6 in part of the surface on which the uneven structure of the uneven-structure-forming layer 4 controls unwanted reflected light and improves the contrast of a displayed image.

The reflecting layer 6 may have a substantially even film thickness, while being formed conforming to the uneven structure of the uneven-structure-forming layer 4. In this case, the surface of the reflecting layer 6 on a side opposite to the surface that is in contact with the uneven-structure-forming layer 4 will have a shape similar to that of the uneven structure of the uneven-structure-forming layer 4. The surface of the reflecting layer 6 on the opposite side to the surface that is in contact with the uneven-structure-forming layer 4, however, may be flat. In this case, the reflecting layer 6 will have an uneven film thickness.

Examples of the material that can be used as the reflecting layer 6 include metals such as aluminum, silver, gold, and alloys thereof. Alternatively, the reflecting layer 6 may be a dielectric layer having a refractive index different from that of the uneven-structure-forming layer 4. Alternatively, the reflecting layer 6 may be a laminate composed of dielectric layers each having a refractive index different from that of an adjacent dielectric layer. In other words, the reflecting layer 6 may be a dielectric multilayer film. When a dielectric multilayer film is used, the refractive index of the dielectric layer that is in contact with the uneven-structure-forming layer 4 is preferably different from that of the uneven-structure-forming layer 4.

(Other Layers)

The display 10 of the present invention may further include other layers such as an adhesive layer, a resin layer and a printed layer.

The adhesive layer can be provided, for example, so as to cover the reflecting layer 6. Normally, the surface of the reflecting layer 6 has a configuration that is almost identical to an uneven configuration of the interface between the uneven-structure-forming layer 4 and the reflecting layer 6. Providing an adhesive layer can prevent the surface of the reflecting layer 6 from being exposed. Therefore, it is difficult to duplicate the uneven configuration of the interface for the purpose of counterfeit.

The resin layer is, for example, a hard coat layer that prevents the surface of the display 10 from being damaged when the display 10 is in use, an antifouling layer that prevents attachment of dirt, an anti-reflecting layer that prevents light from reflecting off a surface of the substrate, and an antistatic layer. The resin layer can be provided on a front surface of the display 10. For example, when the uneven-structure-forming layer 4 side is taken to be a rear side and the reflecting layer 6 side serves as a front side, covering the reflecting layer 6 with the resin layer can not only control damage of the reflecting layer 6 but can also make it difficult to duplicate the uneven structure for counterfeiting as well.

The printed layer is provided to display an image such as of a letter, a picture, or a symbol. The printed layer may be provided on a surface of the substrate 2 opposite to the surface on which the uneven-structure-forming layer 4 is provided between the uneven-structure-forming layer 4 and the reflecting layer 6, or on a rear surface of the reflecting layer 6. The printed layer may also be provided being or not being overlapped with the first region R1 in plan view. Different kinds of ink such as offset ink, letterpress ink and gravure ink are used depending on printing methods. These kinds of ink can be classified into resin-based ink, oil-based ink, water-based ink, and the like according to compositions thereof, or can be classified into oxidation polymerization type ink, penetration drying type ink, evaporation drying type ink, ultraviolet curing type ink, and the like according to drying methods thereof. The kind of ink to be used is selected as appropriate depending on the type of the substrate 2 and the printing method. Besides normal colored ink, special ink such as light (e.g., fluorescent light)-emitting ink, cholesteric liquid crystal ink, or pearl ink may be selected as a material of the printed layer. The printed layer formed of the pearl ink can produce a color relatively similar to the structural color expressed by the display 10. Therefore, applying the printed layer formed of the pearl ink can provide a part for displaying iridescent change due to the structural color and the periodic structure and a part for displaying only a color similar to the structural color. This can further complicate the color production of the display, which can in turn make counterfeiting more difficult.

(Uneven Structure in a First Region R1 of the Uneven-Structure-Forming Layer 4)

Now a description will be given of an uneven structure in a first region R1 of the uneven-structure-forming layer 4.

The uneven structure in the first region R1 serves as a basic unit of an uneven structure in the first region group G.

Figure 2:
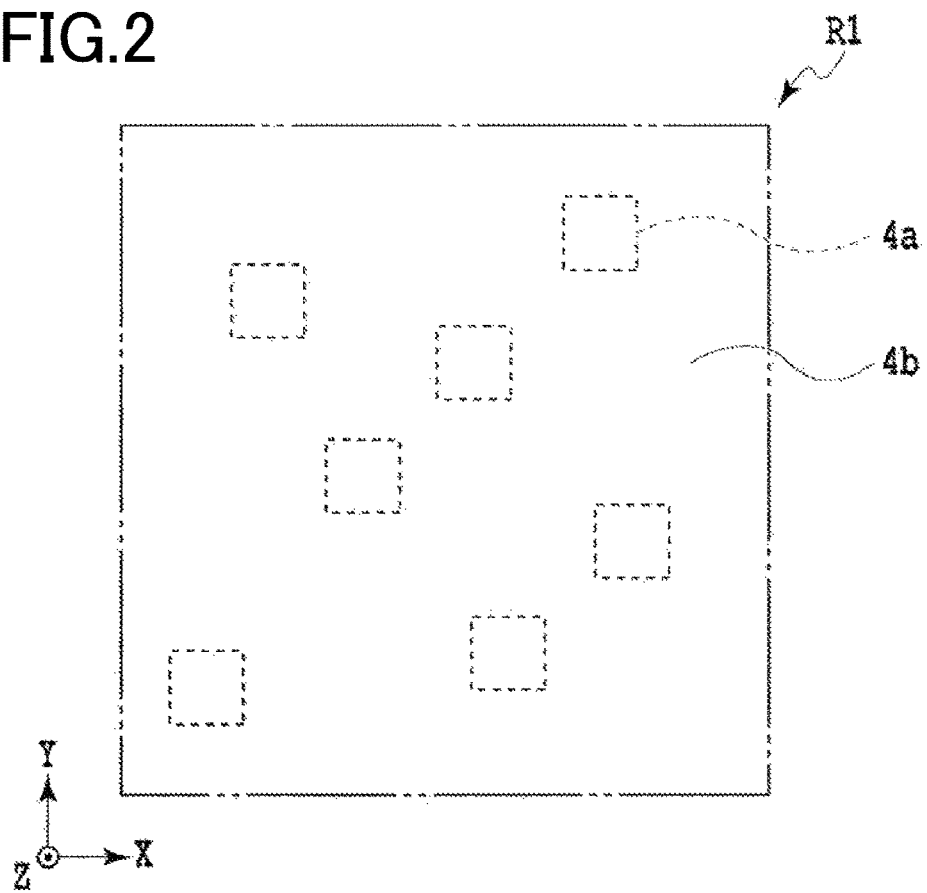
FIG. 2 is a schematic diagram illustrating an example of an uneven structure of a first region of an uneven-structure-forming layer.

FIG. 2 is a view schematically illustrating an example of the uneven structure in a first region R1 of the uneven-structure-forming layer 4, i.e. an enlarged view of the first region R1 shown in FIG. 1B.

Figure 3:
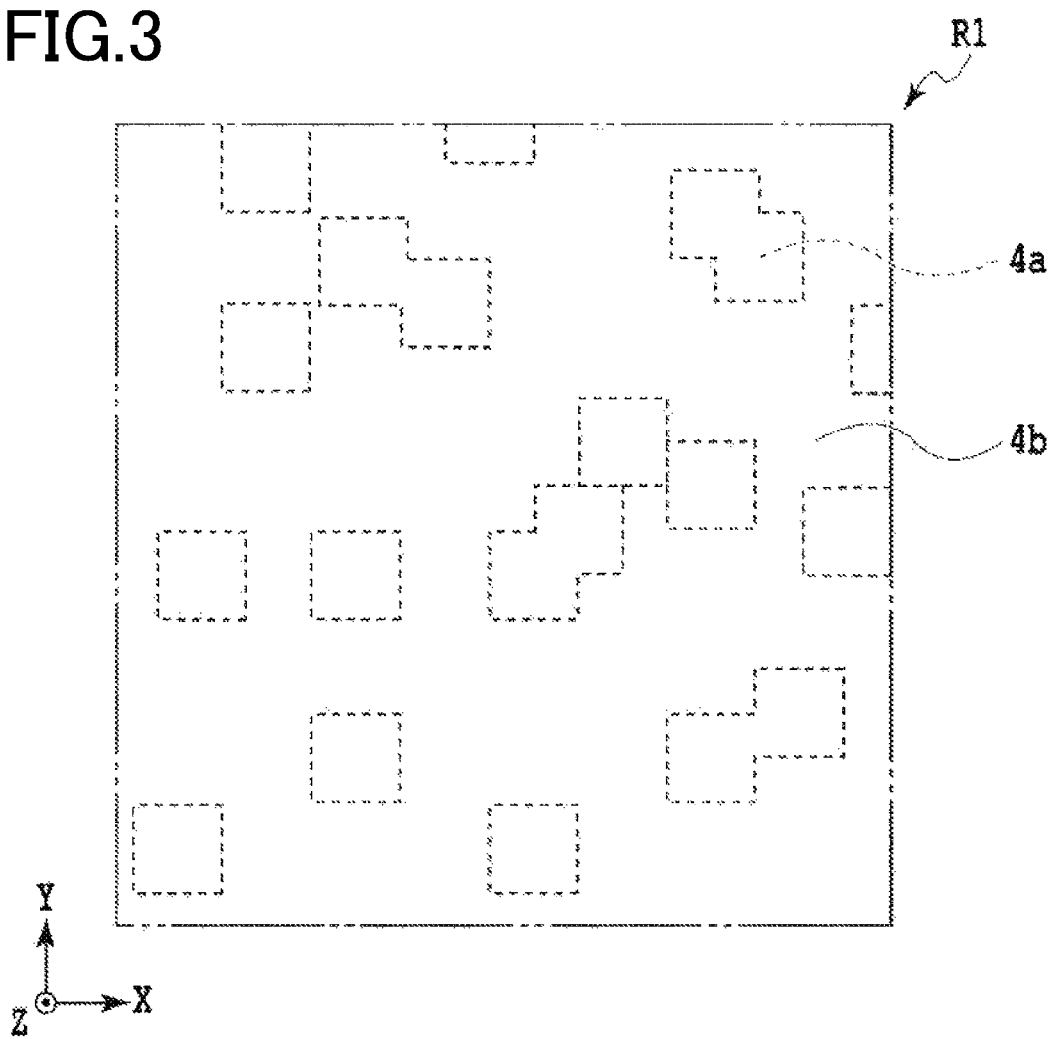
FIG. 3 is a schematic diagram illustrating another example of an uneven structure of a first region of an uneven-structure-forming layer.

In FIG. 2, the bottom surface of the concavity 4a has a square shape in plan view. In the present invention, however, the shape of the bottom surface of each concavity 4a (or the top surface of each convexity) is not limited to a square shape, but may be formed in any shape. Examples of the shape that can be adopted as the shape of the bottom surface of the concavity 4a include a triangle, a quadrant such as a rectangle and a trapezoid, a polygon such as a pentagon and a hexagon, a circle, an ellipse, a star, a cross, and an L shape. Alternatively, concavities 4a of a different shape may be mixedly provided in the first region R1. Further, the bottom surfaces of the concavities 4a (or the top surfaces of the convexities) may be similar to each other in shape but with a different size. As in the example shown in FIG. 3, the bottom surface of the concavities 4a (or the top surface of convexities) may partially overlap with that of other concavities 4a (or of other convexities).

As described above, the bottom surface of the concavities 4a (or the top surface of the convexities) may be formed into any shape. However, all the bottom surfaces preferably have an identical shape to intensify the diffracted light in a specific direction for improved observation of the iridescent change due to the periodic structure. From the aspect of ease in manufacture, each of the concavities 4a preferably has a rectangular shape, and more preferably has a quadrangular shape.

In the example shown in FIG. 2, seven concavities 4a are arranged such that the sides of the bottom surface of each square concavity 4a are oriented in the X or Y direction. The arrangement is, however, not limited to this in the present invention. For example, the concavities 4a (or convexities) may be arranged such that the sides of the bottom surface of each concavity 4a (or the top surface of each convexity) are differently oriented from other concavities 4a (or convexities).

The long side and the short side of the top surface of each convexity or of the bottom surface of each concavity of the uneven structure may have respective lengths, for example, of 0.3 µm-10 µm, and preferably 0.3 µm-5 µm. The long and the short sides are defined herein as follows. First, the longest line segment connecting two points on an outline of the bottom surface of a concavity (or the top surface of a convexity) is defined as the long side. Then, a rectangle circumscribing the outline of the bottom surface of the concavity (or the top surface of the convexity) having a side parallel to the long side is drawn, and this shorter side is defined as the short side of the bottom surface of the concavity (or the top surface of the convexity). When the bottom surface of the concavity (or the top surface of the convexity) is, for example, a square where all the lengths and internal angles of the sides are equal, the long side and the short side have an equal length.

In the uneven structure of the first region R1 in the display 10 of the present invention, the distances between the centers of adjacent concavities 4a (or convexities) are not equal. The distances between the centers of adjacent concavities 4a (or convexities) refer to a length connecting the centers or the gravity centers of the bottom surfaces (or top surfaces of the convexities) of the adjacent concavities 4a.

The bottom surface of each concavity 4a or the top surface of each convexity is substantially parallel to the surface of the flat part 4b. Further, the bottom surface of each concavity 4a or the top surface of each convexity, and the surface of the flat part are smooth.

Figure 4:
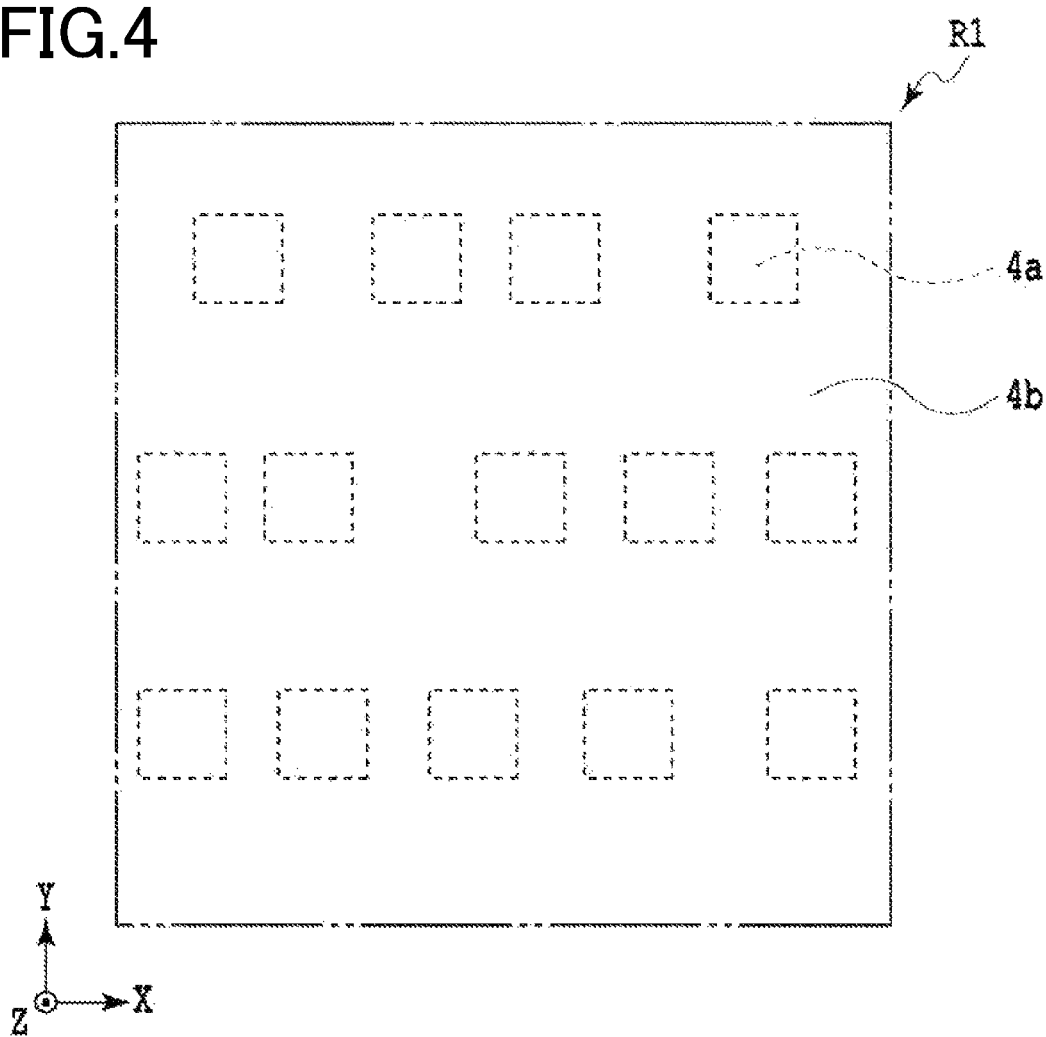
FIG. 4 is a schematic diagram illustrating another example of an uneven structure of a first region of an uneven-structure-forming layer.
Figure 5:
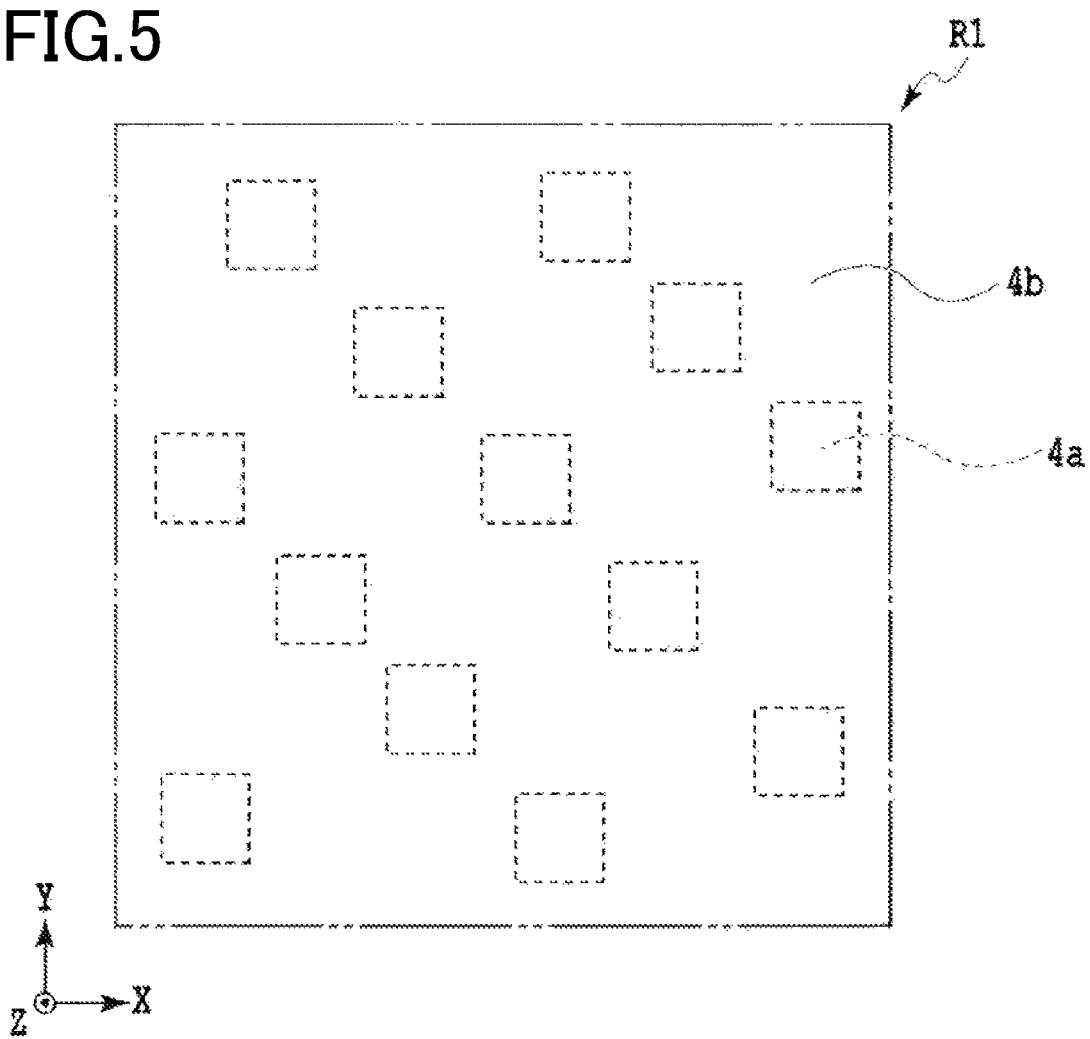
FIG. 5 is a schematic diagram illustrating another example of an uneven structure of a first region of an uneven-structure-forming layer.
Figure 6:
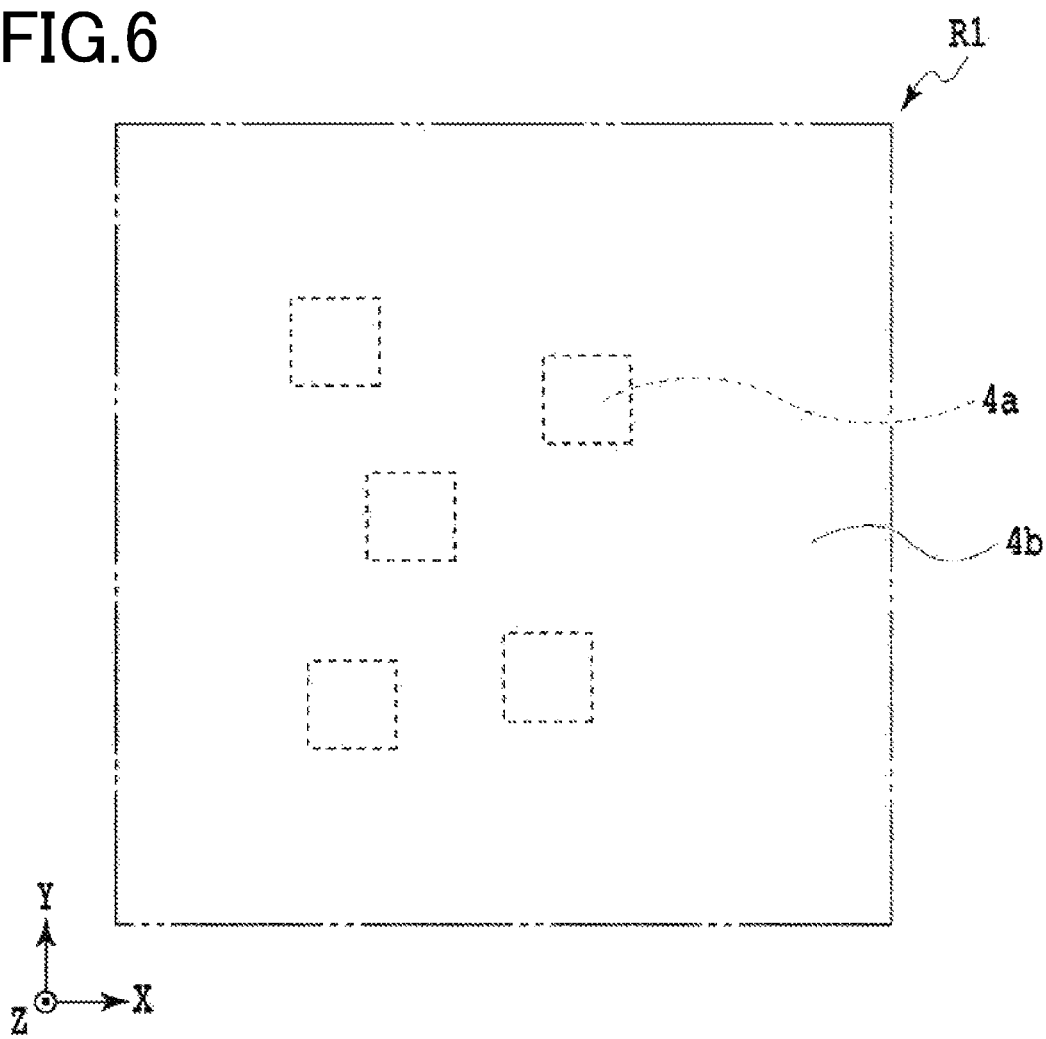
FIG. 6 is a schematic diagram illustrating another example of an uneven structure of a first region of an uneven-structure-forming layer.

The convexities or concavities in the first region R1 may be arranged in any way as long as adjacent convexities or concavities have centers regularly distanced from each other. As shown in FIG. 2, for example, the convexities or concavities can be randomly provided in the first region R1 (hereinafter also referred to as "random arrangement"). The convexities or concavities may also be arranged in a specific direction such that the distances between the centers of convexities or concavities, which are adjacent in the specific direction become random (hereinafter also referred to as "anisotropic arrangement"). The "specific direction" here refers to a predetermined one selected direction in an XY plane. As shown in FIG. 4, for example, the concavities 4a may be arranged side by side in the X direction, which is a specific direction. As shown in FIG. 5, the concavities 4a may also be arranged in an oblique direction, which is also a specific direction. Such an arrangement can control the scattering directions of light. Therefore, this arrangement can change the visibility of the image between when observed in the arrayed direction of the concavities 4a and when observed in the direction orthogonal thereto. The convexities or concavities do not need to be arranged all over the first region R1. For example, as shown in FIG. 6, the convexities or concavities may be arranged in part of the first region R1. Although the convexities or the concavities are thus arranged in a part of the first region R1, the color change due to the periodic structure is similar to that in the case where the convexities or the concavities are arranged all over the first region R1. This is because the first regions R1, which are provided with the convexities or the concavities, are arranged at a regular pitch. However, the structural color will have a lower brightness because the occupancy of the top surface of the convexity or the bottom surface of the concavity is reduced in the first region R1

Figure 7:
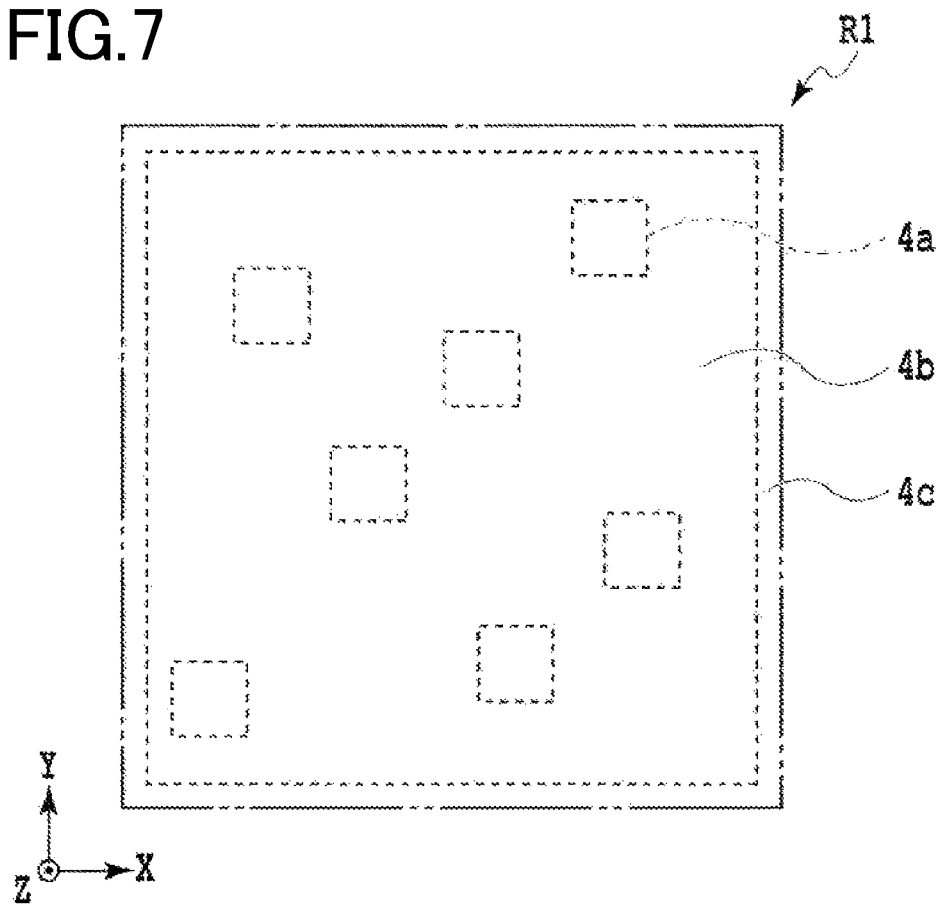
FIG. 7 is a schematic diagram illustrating another example of an uneven structure of a first region of an uneven-structure-forming layer.

In the present invention, the uneven-structure-forming layer 4 may further have convexities or concavities each defining the first region R1, on the uneven structured surface. In the example shown in FIG. 7, a linear concavity 4c is provided around the first region R1 to define the first region R. This intensifies the diffracted light, making it easier to observe the iridescent change due to the periodic structure of the first region R1.

In the first region R1, the convexities or concavities have a uniform height and depth relative to a surface of the flat part, for example, 0.05 µm-0.5 µm, and preferably 0.07 µm-0.4 µm. The height of the convexities or the depth of the concavities affects diffraction efficiency. When the height of the convexities falls within the above range, the display 10 appears bright. If the height (depth) of the convexity (concavity) is too short, a specific wavelength region is less influenced by light interference which depends on the depth (height) between the concavity 4a (or convexity) and the flat part 4b. Accordingly, it is difficult to display the structural color. In addition, an external factor in a manufacturing process, such as a state variation in manufacturing equipment, a variation in surroundings, and a slight change in a material composition, has a large effect on optical properties of the uneven structure. However, if the depth (height) of the concavity 4a (or convexity) is too long, a wavelength of the interfering light depending on the depth (height) between the concavity 4a (or convexity) and the flat part 4b varies too widely depending on observation angles, resulting in too great color change depending on the observation directions. Accordingly, the observer cannot easily recognize the structural color. Also, if the depth (height) of the concavity 4a (or convexity) is too long, difficulty is involved in forming the uneven structure with high accuracy in shape and dimension.

The height of the convexities or the depth of the concavities that is uneven relative to the surface of the flat part in the first region R1 causes interference of light of all wavelengths in the visible region. As a result, light having various wavelengths evenly reaches the observer's eyes, which disables the observer from perceiving a particular color corresponding to the depth of the concavity or the height of the convexity, only to perceive it as a white color. As described later, the display of the present invention has a periodic arrangement of the first region R1 provided with the uneven structure, and thus produces a color change due to the periodic structure. In this color change, the height of the convexities or the depth of the concavities that is uneven relative to the surface of the flat part in the first region R1 causes the diffraction efficiency to vary, making it harder to recognize the color change due to the periodic structure. In other words, it becomes difficult to observe the iridescence due to the periodic structure.

The side surface of the concavity 4a (or the convexity) is substantially perpendicular to the bottom surface of the concavity 4a (or the top surface of the convexity).

The top surface of the convexity or the bottom surface of the concavity occupies, for example, a 20%-80%, and preferably 40%-60%, area of the first region R1. An area where the structural color can be displayed is maximized when an area of the top surface of the convexity or the bottom surface of the concavity and an area of the flat part have a ratio of 1:1, so that the brightest structural color is displayed when the convexity or the concavity occupies an approximately 50% area of the first region R1. An area occupation ratio of 20%-80% achieves color production that is sufficiently bright.

(Uneven Structure in the First Region Group G of the Uneven-Structure-Forming Layer 4)

Now a description will be given on the uneven structure in the first region group G of the uneven-structure-forming layer 4.

An uneven structure in the first region group G of the uneven-structure-forming layer 4 is formed by arranging at a regular pitch the uneven structures in the first region R1 of the uneven-structure-forming layer 4 described above. The uneven structure in the first region R1 serving as a basic unit, the uneven structure in the first region group G is therefore a repetitive arrangement of the basic unit. In the present invention, however, the uneven structure of the first region group G may also be formed by use of concavities 4a (or convexities) as the uneven structure of the first region R1, the number of concavities 4a whose number being the only difference.

Initially described below is an embodiment in which repeatedly arranging the uneven structure in the first region R1, which serves as a basic unit, forms the uneven structure of the first region group G.

Figure 8:
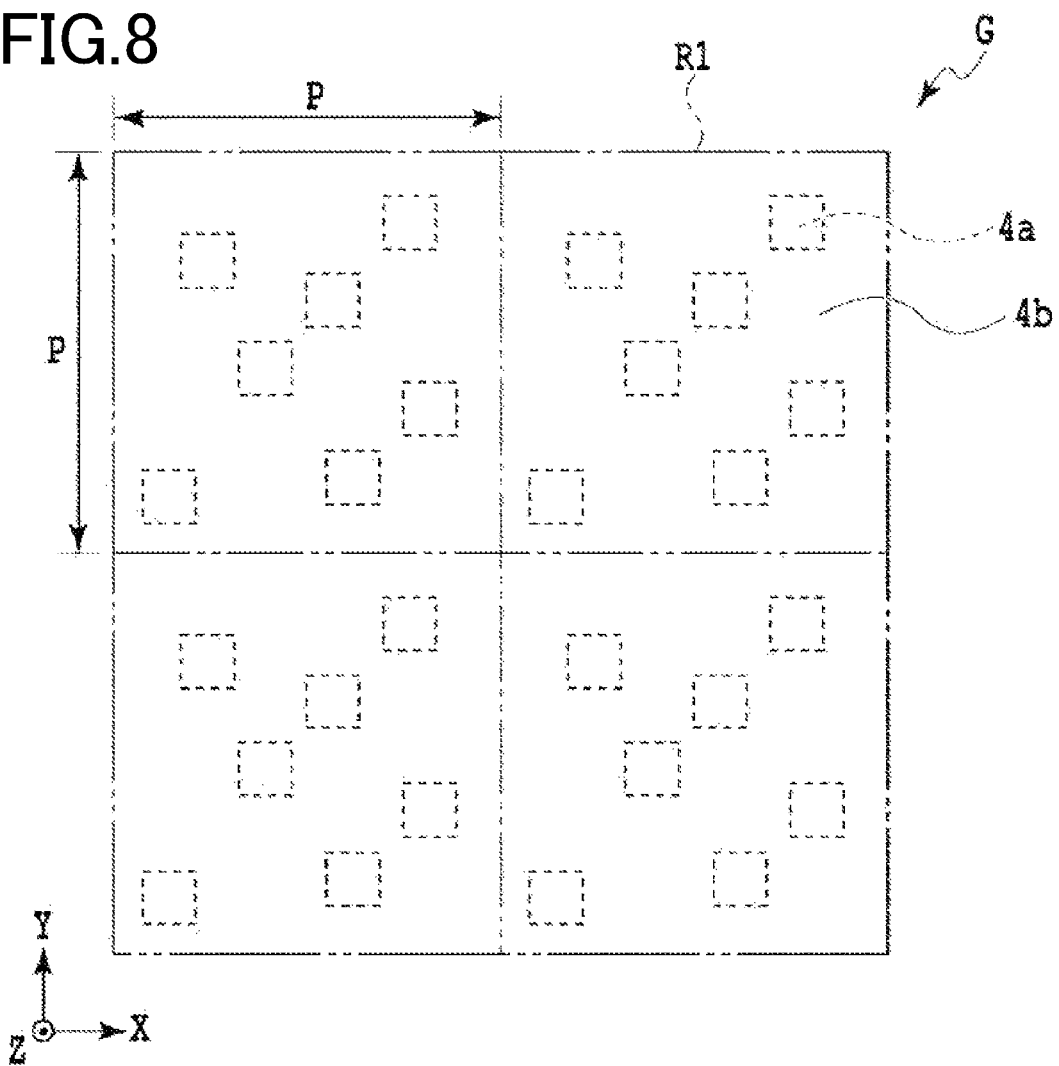
FIG. 8 is a schematic diagram illustrating an example of an uneven structure of a first region group.
Figure 9:
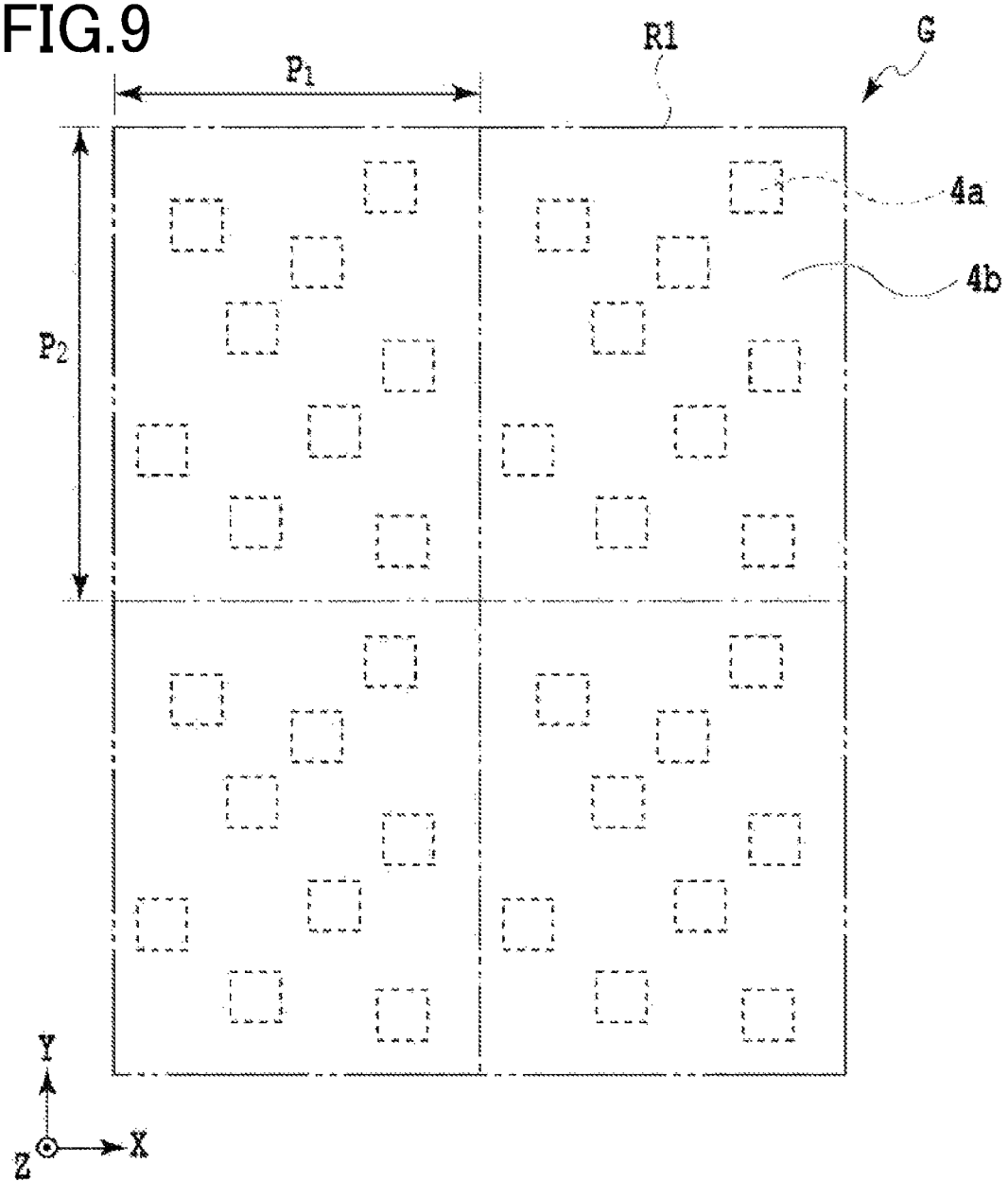
FIG. 9 is a schematic diagram illustrating another example of an uneven structure of a first region group.
Figure 10:
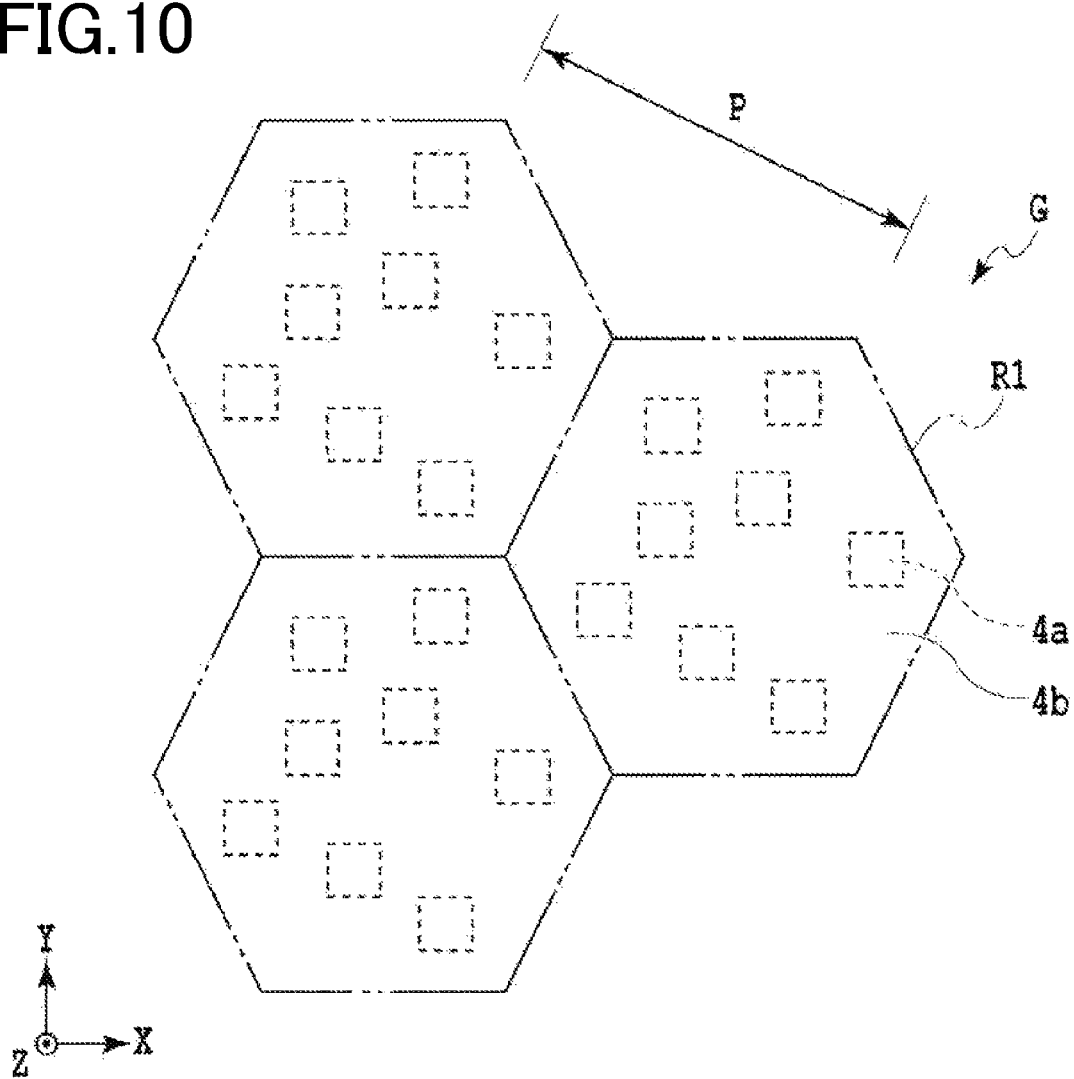
FIG. 10 is a schematic diagram illustrating another example of an uneven structure of a first region group.

FIGS. 8 to 10 are views each schematically illustrating an example of the uneven structure in the first region group G. The first region group G shown in FIG. 8 includes four first regions R1 in total; two first regions R1 each having a square-outer shape are arranged respectively in the X and Y directions in plan view. Each of the four first regions R1 is provided with an identical uneven structure that includes seven concavities 4a and a flat part 4b surrounding the concavities 4a. The outer shape of the first region R1 in the example shown in FIG. 8 is formed into a rectangle in the example shown in FIG. 9. In the example shown in FIG. 10, the first regions R1 whose outer shape is an equilateral hexagon are closely arranged. The "outer shape" of the first region R1 refers to a shape formed by a virtual line provided to define the first region R1. A dash-dot-dot line is used in the accompanying drawings to clarify the outer shape of the first region R1, but such a line is not actually present.

The outer shape of the first region R1 is not limited to those shown in FIGS. 8 to 10. Examples of other kinds of outer shape include a triangle, a tetragon such as a parallelogram and a trapezoid, a pentagon, and other polygon. A square and a rectangle are preferable in terms of ease of manufacture.

An uneven structure in the first region group G of the uneven-structure-forming layer 4 is formed by arranging at a regular pitch the uneven structures in the first region R1 of the uneven-structure-forming layer 4. The arrangement at a regular pitch means here that the first regions R1 are periodically arranged in at least one direction. For example, in the example shown in FIG. 8, the first regions R1 each have a square-outer shape having a side length P, and are closely arranged without cavities therebetween. The first regions R1 are therefore arranged at a pitch P in the X and Y directions. In the example shown in FIG. 9, the first regions R1 each have a rectangular outer shape having a short side length $P_1$ and a long side length $P_2$, and are closely arranged without cavities therebetween. The first regions R1 are therefore arranged at a pitch $P_1$ in the X direction and at a pitch $P_2$ in the Y direction.

In the present invention, the first regions R1 are arranged at a regular pitch. The arrangement at a regular pitch causes the display 10 to produce a color change (diffracted light) caused by the periodic structure. Note that the arrangement pitch of the first region R1 is preferably 1 μm-300 μm on an occasion when the observer uses a fluorescent light, sunlight, and other parallel light, an LED (light-emitting diode) light and other point light source, laser light and others to visually recognize the diffracted light. Arranging the first regions R1 at a pitch within this range, the person observing the display 10 can recognize the color change (diffracted light) caused by the periodic structure, the color change occurring as an observation angle varies, and the structural color caused by the scattered light. A too narrow arrangement pitch of the first region R1 increases the color change due to the periodic structure, possibly posing a risk that the observer fails to correctly recognize the structural color caused by the scattered light. Hence the arrangement pitch of the first region R1 is preferably 5 μm-300 μm, and more preferably 8 μm-300 μm.

When diffracted light falling within or out of the visible light range is detected by, for example, a machine, the arrangement pitch of the first region R1 is not limited to the range of 1 μm-300 μm. For example, on an occasion when the arrangement pitch of the first region R1 is below 1 μm, the diffracted light within the ultraviolet range can be machine-detected by use of a light source having a wavelength shorter than that of ultraviolet light. Using a light-receiving member made of fluorescent material makes it possible to visually check the diffracted light within the ultraviolet range based on a fluorescent state of the light-receiving member. When the arrangement pitch of the first region R1 is above 300 µm, image analysis or other approach can visually confirm the presence of the diffracted light in the visible light range, which is hard to visually determine. Further, the presence of the diffracted light in a range having a wavelength longer than that of ultraviolet light is confirmed by use of a corresponding photodetecting element.

In visual observation of the color change caused by the periodic structure, the extent of the color change that can be recognized may vary depending on light source to be used. The arrangement pitch of the first region R1 may be thus set to an appropriate length depending on which light source to be used. The light sources for observing the display 10 incidentally include sunlight, a fluorescent light and other parallel light, an LED light and other point light source, and a laser light source.

For example, at a time of observation under parallel light such as sunlight or fluorescent light, the arrangement pitch of the first regions R1 is preferably set to 1 µm-30 µm. In observation under an LED light or other point light source, the arrangement pitch of the first regions R1 is preferably 1 µm-100 µm, and more preferably 1 µm-80 µm. In observation under a laser light source, the arrangement pitch of the first regions R1 is preferably 1 µm-300 µm. Note that the range of 1 µm-30 µm, which all the above preferred ranges cover in common, makes it possible to confirm the color change caused by the periodic structure, regardless of which light source is used.

The observation under the point light source and the laser light can be incidentally said to be observation in an environment applied by an inspector, who is a trained expert. The observation under laser light is, in particular, observation in a special environment because the laser light requires a laser light emitter and other special equipment unlike point light sources, which are now relatively accessible due to widespread use of LED lights. Setting the arrangement pitch of the first regions R1 as appropriate so that the color change caused by the periodic structure cannot be observed under parallel light but can be observed under a point light source or the laser light or so that the color change caused by the periodic structure cannot be observed under parallel light and a point light source but can be observed under laser light makes it hard for an ordinary person to determine its authenticity, which in turn further improves the anti-counterfeiting effects. A preferable arrangement pitch of the first regions R1 for making it hard to observe the color change under parallel light and easy to observe the color change under a point light source is 30 µm-100 µm, and more preferably to 30 µm-80 µm. A preferable arrangement pitch of the first regions R1 for making it hard to observe the color change under parallel light and easy to observe the color change under laser light is 30 µm-300 µm. A preferable arrangement pitch of the first regions R1 for making it hard to observe the color change under parallel light and the point light source and easy to observe the color change under laser light is 80 µm-300 µm, and more preferably to 100 µm-300 µm.

Further, the first regions R1 may be arranged with a gap therebetween in the present invention. Examples of this arrangement are shown in FIGS. 11 and 12.

Figure 11:
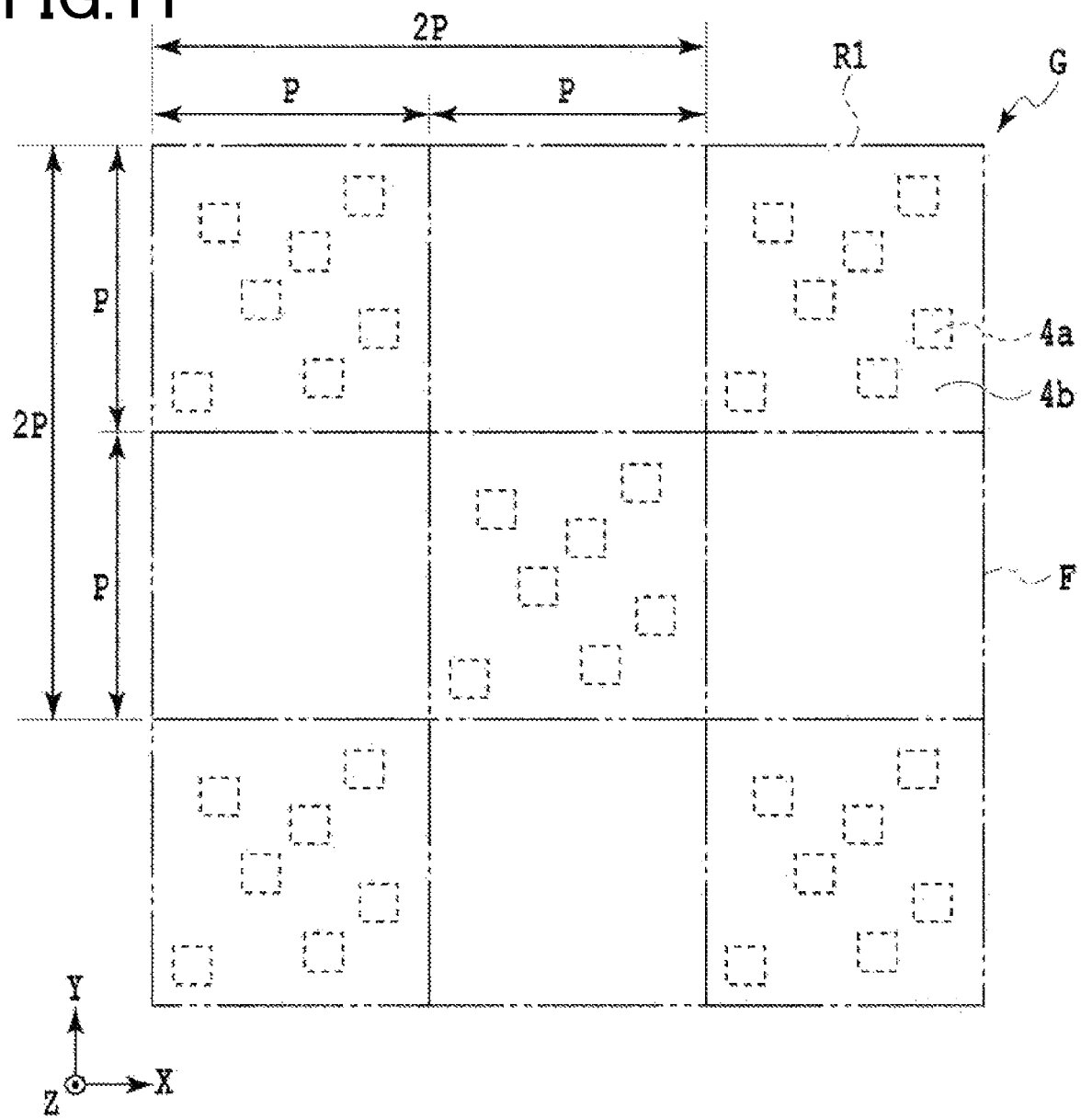
FIG. 11 is a schematic diagram illustrating another example of an uneven structure of a first region group.

In the example shown in FIG. 11, the first regions R1 are arranged alternately with the flat region F. In the figure, the first region R1 and the flat region F both have square-outer shapes each having a side length P. The first regions R1 are therefore arranged at a pitch 2P in the X and Y directions.

Figure 12:
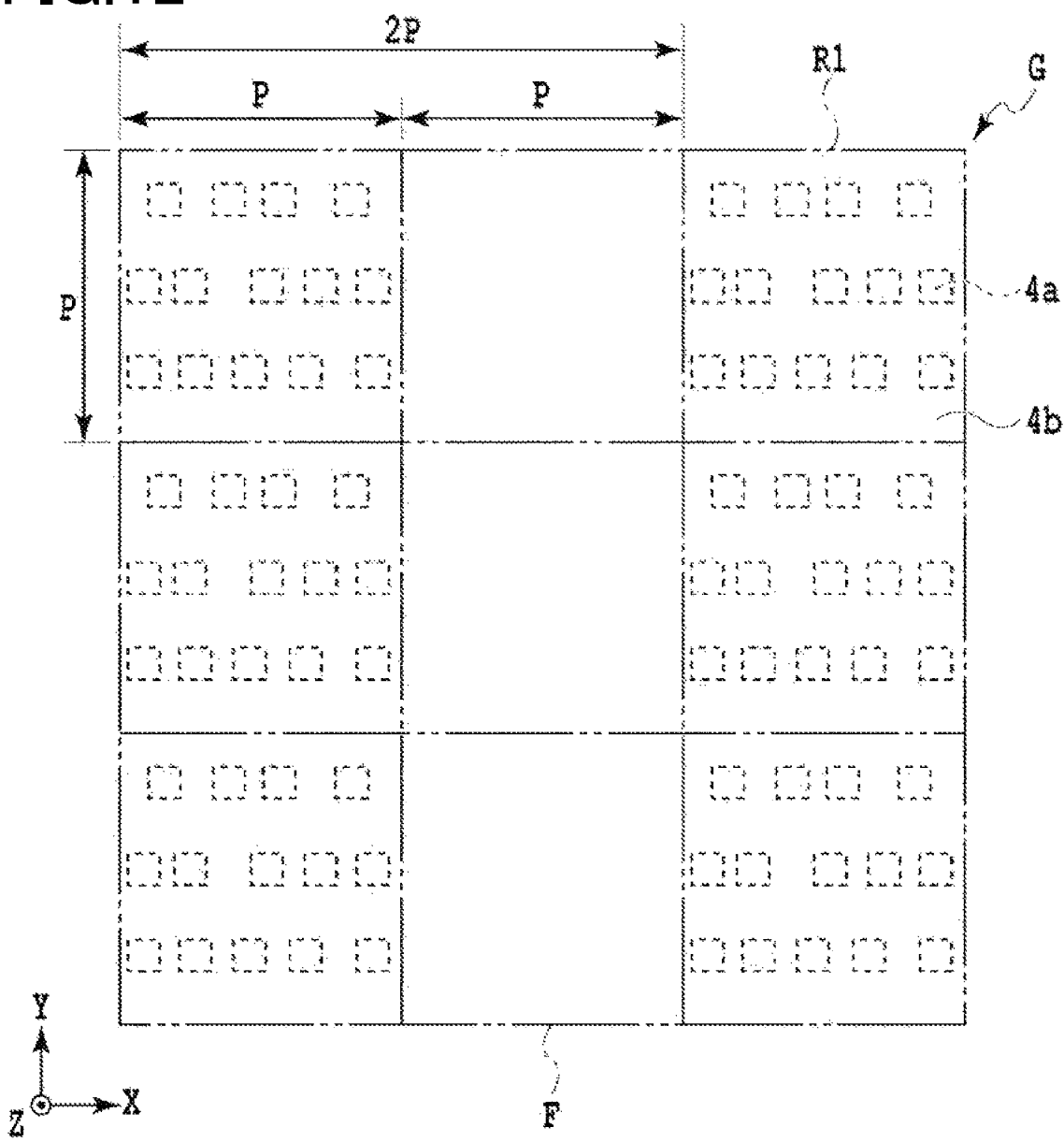
FIG. 12 is a schematic diagram illustrating another example of an uneven structure of a first region group.

In the example shown in FIG. 12, the first regions R1 and the flat regions F are arranged adjacent to each other in the Y direction, and the first regions R1 and the flat regions F are alternately arranged in the X direction. In the figure, the first region R1 and the flat region F both have square-outer shapes each having a side length P. The first regions R1 are therefore arranged at the pitch 2P in the X direction and at the pitch P in the Y direction.

When the flat regions F are thus combined with the first regions R1, the first regions R1 occupy less of the first region group G than on an occasion when no flat region F is combined. Since the brightness of the structural color depends on an area ratio of the concavities or the convexities provided in the first region R1, a lower ratio of the first region R1 lowers the brightness of the structural color. This means a longer arrangement pitch of the first regions R1, which makes it harder to recognize the iridescence change due to the periodic structure. Thus combining the flat regions F with the first regions R1 can produce a color different from the color produced on the occasion when no flat region F is combined.

In the present invention, the uneven structure of the uneven-structure-forming layer 4 may be formed by combination of different first region groups. In the different first region group, the uneven structure in the first region R1, which serves as the basic unit, is different or the arrangement pitch of the first regions R1 is different. "The uneven structures are different" means here that at least one of the followings is different: a shape of the bottom surface of the concavities 4a (or the top surface of the convexities) described in the above section "Uneven structure in a first region R1 of the uneven-structure-forming layer 4", the arrangement of the concavities (or the convexities), the height of a long side and a short side of the bottom surface of the concavities, the depth of the concavities (or the height of the convexities), and a ratio which the top surface of the convexities or the bottom surface of the concavities occupies in the first region R1.

Figure 13:
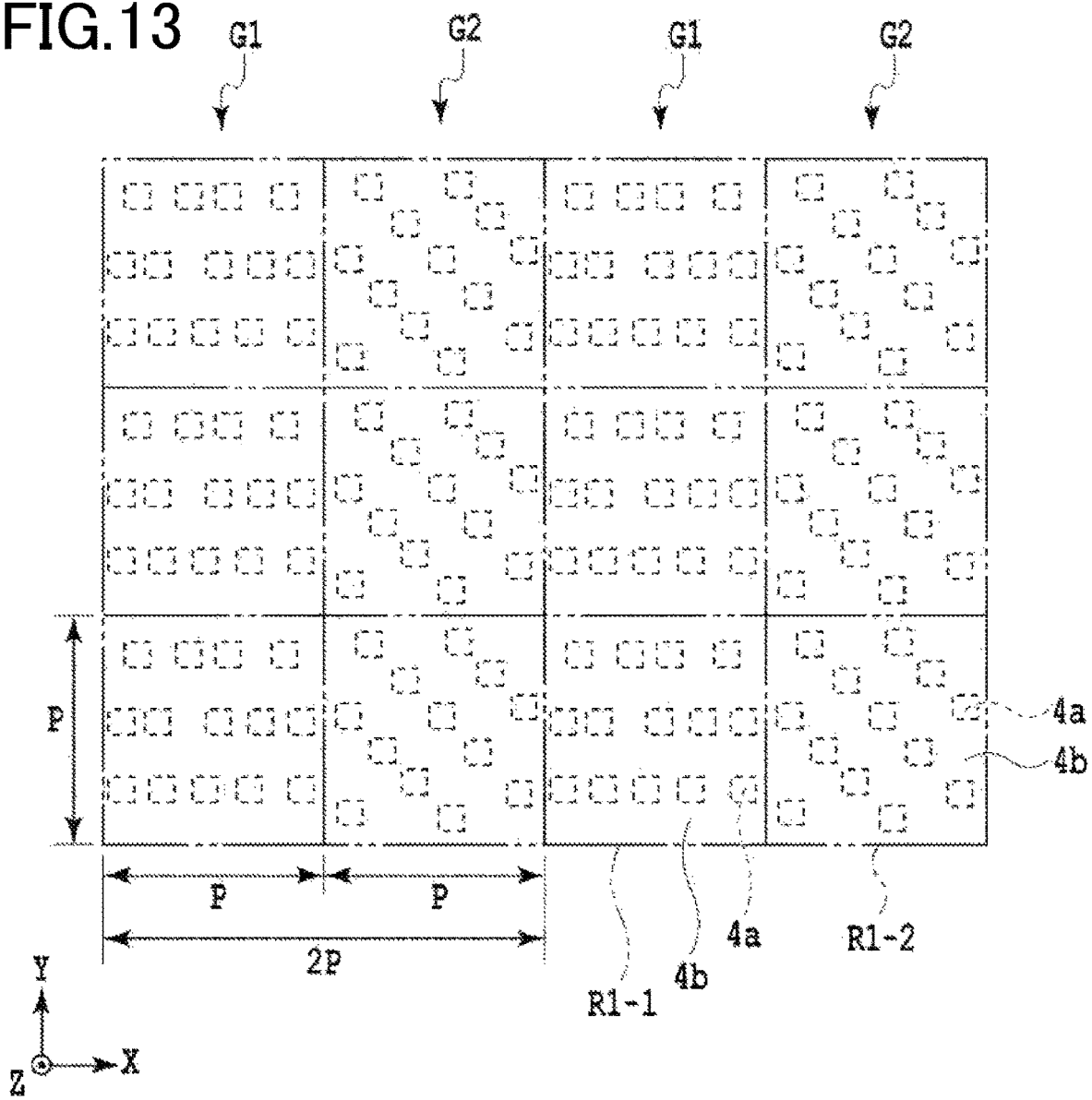
FIG. 13 is a schematic diagram illustrating an example of an uneven structure of an aspect in which mutually different first region groups are combined.
Figure 14:
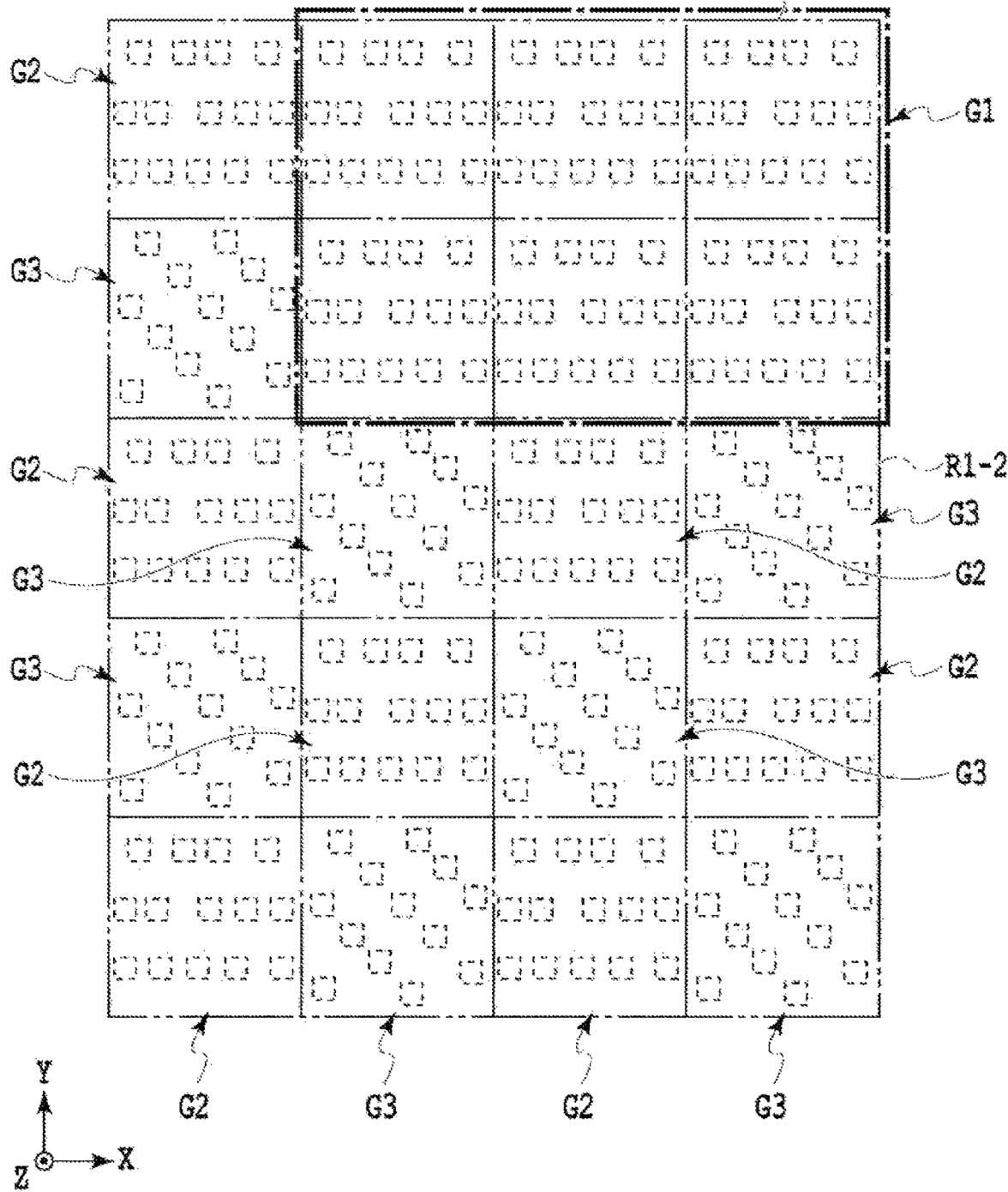
FIG. 14 is a schematic diagram illustrating another example of an uneven structure of an aspect in which mutually different first region groups are combined.

Examples of a combination of the different first region groups are shown in FIGS. 13 and 14.

The example shown in FIG. 13 is formed by a combination of two kinds of first region groups, i.e., a first region group G1 including a first region R1-1 and a first region group G2 including a first region R1-2. In the first region group G1 including the first regions R1-1, the first regions R1-1 are arranged at a pitch P in the Y direction and are arranged at a pitch 2P in the X direction. In the first region group G2 constituted by the first regions R1-2 as well, the first regions R1-2 are arranged at a pitch P in the Y direction and are arranged at a pitch 2P in the X direction. Note that the first region R1-1 and the first region R1-2 respectively correspond to the first region R1 shown in FIGS. 4 and 5.

In the example shown in FIG. 13, observing a display surface of the display 10 either in the X direction or in the Y direction makes substantially no difference in how the structural color appears because the concavities have a uniform depth. In contrast, the arrangement pitches of the first regions R1-1 and R1-2 are different between the X direction and the Y direction. More specifically, the first regions R1-1 and R1-2 are arranged at the pitch 2P in the X direction and at the pitch P in the Y direction. This means that a diffraction angle of diffracted light emitted in the X direction is approximately a half of a diffraction angle of diffracted light emitted in the Y direction, which makes a difference in how the color change caused by the periodic structure appears between the observation in the X direction and the observation in the Y direction. For example, in FIG.

13, assuming that the first regions R1-1 and R1-2 are arranged at 160 μm in the X direction and 80 μm in the Y direction. In this case, if a point light source is used to irradiate the display, the color change caused by the periodic structure cannot be observed in the Y direction, though it can be observed in the X direction. Arranging the first regions such that the pitch lengths differ depending on directions can make a difference in how the color change caused by the periodic structure looks.

The example shown in FIG. 14 is formed by a combination of three kinds of first region groups, more specifically, by a combination of a first region group G1 in which the first regions R1-1 are arranged in the pitch P in the X and Y directions, a first region group G2 in which the first regions R1-1 are arranged in a pitch 2P in the X and Y directions, and a first region group G3 in which the first regions R1-2 are arranged at the pitch 2P in the X and Y directions. Note that the first region R1-1 and the first region R1-2 respectively correspond to the first region R1 shown in FIGS. 4 and 5.

As described above, the first region group G1 has a pitch of the first region R1-1 in the X and Y directions, a pitch with a half-length of that in the first region group G2 and the first region group G3, which makes it is easier to observe the iridescent change.

The iridescent change is more prominent when an LED light and other point light source is used compared to the case where a fluorescent light and other parallel light is used.

In the example of FIG. 14, combining the first region groups G1, G2, and G3, each having a different arrangement pitch of the first region R1-1, to form a symbol also makes it possible to observe a symbol under the LED light, a symbol that cannot be observed under the fluorescence light, though it depends on how long the arrangement pitch is. Hence, by using a fluorescent light and an LED light as appropriate, an image whose symbol varies iridescently can be formed. This is a simple method to confirm the presence of the symbol because fluorescent lights and LED lights are light sources used by the general public.

In the example shown in FIG. 14, using the first regions R1-1 each having an identical outer shape and size (a square with a side length P) in the first region group G1 and the first region groups G2 and G3 and changing how the first regions R1-1 are arranged to differentiate the pitches, but this is not the only approach. The pitch of the first region R1-1 may be differentiated by use of the first regions R1-1 each having a different outer shape and/or size in each first region group.

Forming the uneven structure of the uneven-structure-forming layer 4 from a combination of a plurality of mutually different first region groups makes it possible to manufacture a display applied to a variety of designs.

Next, an embodiment where the uneven structure of the first region group G is formed by use of an uneven structure, as the uneven structures of the first region R1, where the number of concavities 4a (or convexities) is the only difference.

Figure 15:
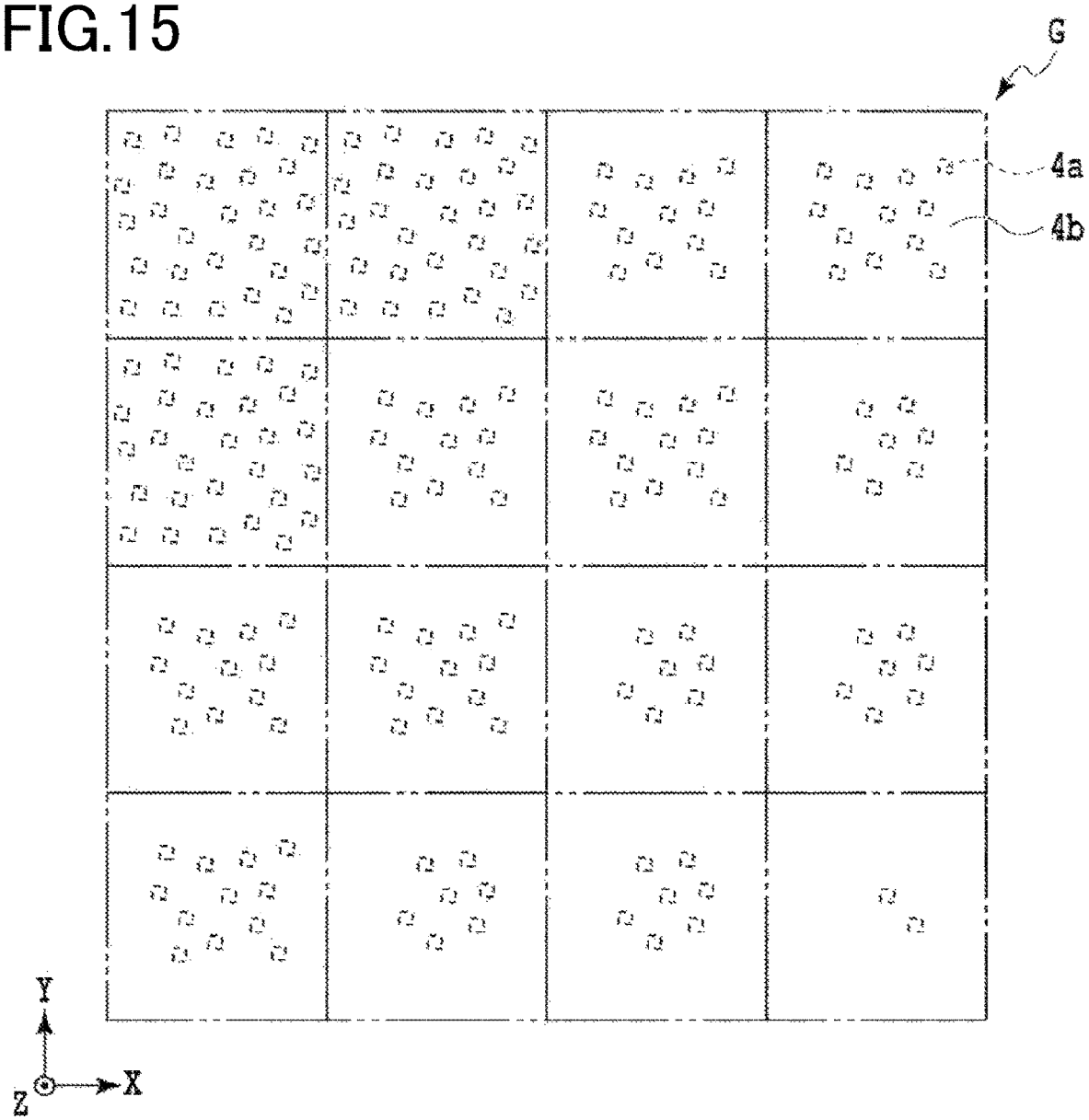
FIG. 15 is a schematic diagram illustrating another example of an uneven structure of a first region group.

In the example shown in FIG. 15, the number of the concavities 4a in each first region R1 gradually decreases from the upper left end to the lower right end of the first region group G. In addition, the number of the concavities 4a in each first region R1 remains unchanged or gradually decreases in the X and Y directions. As described above, the first region group G has uneven structures in which the number of the convexities or concavities in the first region R1 remain unchanged or gradually decreases or increases in the specific direction in the present invention. The "specific direction" here refers to a predetermined one or a plurality of arbitrary direction(s) in the XY plane. The present invention does not only include the mode in which the number of the concavities 4a (or convexities) in each first region R1 gradually changes in the specific direction but also a mode in which first regions R1 each having an equal or different number of concavities 4a (or convexities) are randomly combined.

The number of the concavities (or convexities) is the only difference between the first regions in the present embodiment. As in the case where an identical number of concavities (or convexities) are arranged in each first region, therefore, the iridescent change due to the periodic structure and the representation of the structural color can be achieved. In particular, when the number of concavities is gradually varied in each first region R1 in a specific direction as in the example shown in FIG. 15, the intensity of the diffracted light and the brightness of the structural color caused by the periodic structure can be gradually varied.

Providing the first area group G described above in accordance with a shape of, for example, a desired letter, a figure, and a symbol can display the letters and others on the display 10 in color.

In the example shown in FIG. 1A, the display 10 displays characters 8 of "T", "O", and "P". Each of the letters 8 is constituted by a first region group G where the plurality of first regions R1 is regularly arranged. Note that, as shown in the figure, a first region R1 that has an outline of the letter 8 can assume an outer shape along the outline. In FIG. 1B, a region other than a letter part is a second region R2, which has a flat structure.

In the present invention, the uneven-structure-forming layer 4 may be formed by provision of different first region groups G for each section where letters and designs are displayed. For example, the uneven-structure-forming layer 4 may be formed by provision of first region groups G each having concavities (or convexities) whose depth (or heights) are different for each section where letters and designs are displayed. The uneven-structure-forming layer 4 may also be formed by provision, for each letter or design section, of a first region group G having a plurality of the first regions R1 where the convexities or concavities are randomly arranged and a first region group G having a plurality of the first regions R1 where the convexities or concavities are anisotropically arranged. In addition, the uneven-structure-forming layer 4 may be formed by provision, for each letter or design section, of a first region group G having first regions R where the convexities or concavities are anisotropically arranged. For example, in the example shown in FIG. 1, "T" can be formed as a basic unit of the randomly arranged uneven structure of FIG. 2, "O" can be formed as a basic unit of the anisotropically arranged uneven structure of FIG. 4, and "P" can be formed as a basic unit of the anisotropically arranged uneven structure of the FIG. 5.

Note that the various embodiments and modifications described above can be applied in combination of two or more of them.

(Visual Effect of the Display 10)

In the display 10 of the present invention, the uneven-structure-forming layer 4 has a first region group G constituted by a plurality of first regions and has a specific uneven structure in the first region R1. In addition, the first regions R1 are arranged at a regular pitch. As a result, the display 10 of the present invention exhibits the iridescent change due to the periodic structure in accordance with a variation in the observation angle, and represents a color with high chroma (structural color) caused by light interference according to the depths of concavities 4a and flat parts 4b (or the heights of the convexities). Its principles will be described below.

First, here is the reason why the display 10 of the present invention exhibits a color change according to the variation in the observation angle.

Irradiating the diffraction grating by use of an illumination light source causes the diffraction grating to emit strong diffracted light in a specific direction according to a traveling direction and wavelength of the illumination light, which serves as incident light.

In a circumstance where the light travels in a plane perpendicular to a longitudinal direction of a groove of the diffraction grating, an emission angle β of an m-th order diffracted light (m=0, ±1, ±2, ... ) can be calculated by the formula below.

$$d = m\lambda/(\sin \alpha - \sin \beta) \quad \text{(Equation 1)}$$

In the Equation 1, "d" represents a grating constant (grating pitch) of the diffraction grating, "m" represents a diffraction order, and "λ" represents wavelengths of the incident light and the diffracted light. In addition, "α" represents an emission angle of zero-order diffracted light, that is, specularly reflected light RL. In other words, an absolute value of α is equal to an incident angle of the illumination light. As for a reflective diffraction grating, an incident direction of the illumination light and an emission direction of the specularly reflected light are symmetrical about a normal NL of an interface where the diffraction grating is provided.

Note that, when the diffraction grating is of a reflection type, the angle α is 0° or greater and below 90°. Assuming that two angle ranges where illumination light is emitted in an oblique direction relative to the interface where the diffraction grating is provided and the angle in the normal direction, or 0°, is taken as a boundary value. In this case, the angle β is a positive value when the emission direction of the diffracted light and the emission direction of the specular reflection light fall within an identical angle range while it is a negative value when the emission direction of the diffracted light and the incident direction of the illumination light fall within an identical angle range.

Figure 16:
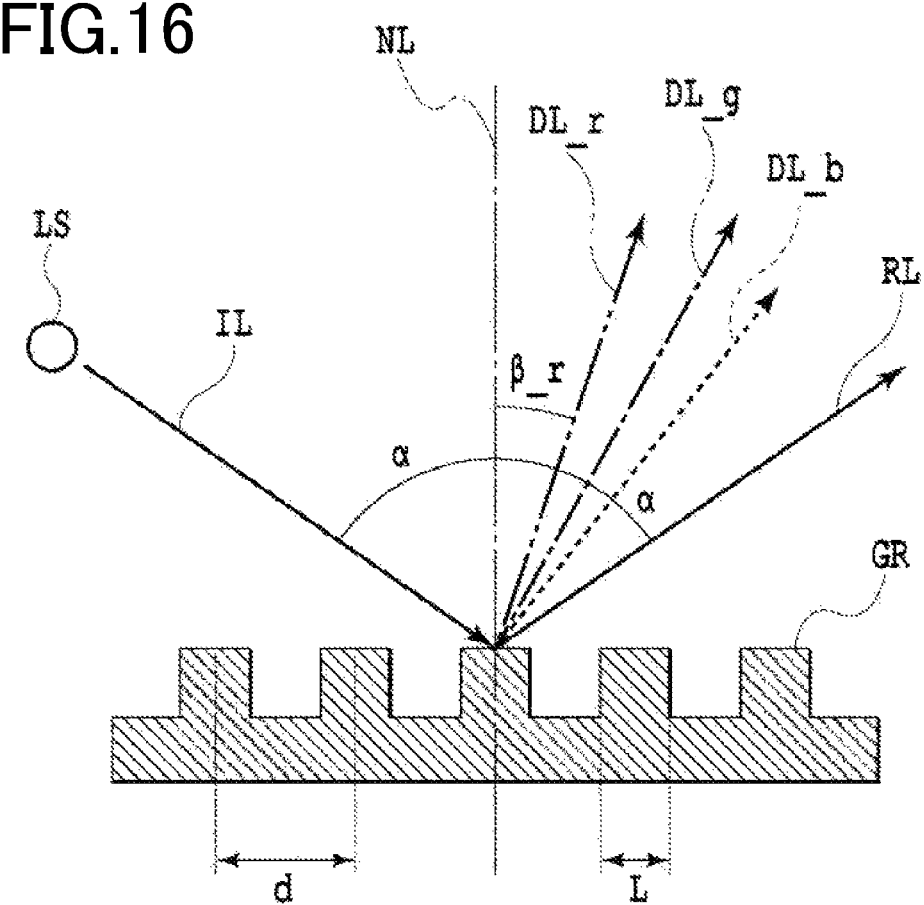
FIG. 16 is a schematic diagram illustrating how a diffraction grating emits primary diffracted light.

FIG. 16 is a view schematically illustrating how the diffraction grating emits primary diffracted light.

A point light source LS emits white light including a light component R whose wavelength falls within a red range, a light component G whose wavelength falls within a green range, and a light component B whose wavelength falls within a blue range. The light components G, B, and R emitted by the point light source LS are incident on a diffraction grating GR at an incident angle α. The diffraction grating GR emits a diffracted light DL_g at an emission angle β_g as a part of the light component G, emits a diffracted light DL_b at an emission angle β_b as a part of the light component B, and emits a diffracted light DL_r at an emission angle β_r as a part of the light component R. Although not illustrated, the diffraction grating GR emits diffracted light of another order at an angle derived by the Equation 1.

Thus under predetermined illumination conditions, the diffraction grating emits diffracted light at different emission angles according to the wavelength thereof. Hence under a white light source such as sunlight and fluorescent light, the diffraction grating emits light of different wavelengths at different angles. Under such illumination conditions, therefore, the display color of the diffraction grating varies iridescently.

In the display 10 of the present invention, an uneven structure is provided on the surface of the uneven-structure-forming layer 4. This uneven structure is provided in a first region R1 on the surface of the uneven-structure-forming layer 4. The first regions are regularly arranged at regular pitches. From the above description, it can be said that, in the display 10 of the present invention, the uneven-structure-forming layer 4 has concavities 4a (or convexities) arranged at regular pitches. Further describing this with reference to the example shown in FIG. 8, the first regions R1 provided with seven concavities 4a are arranged in the X and Y directions at the pitch P. Focusing on each of the seven concavities 4a, it can be said that each of the concavities 4a is regularly arranged at the pitch P in the X and Y directions between the first regions R1.

Hence, as with a normal diffraction grating, changing an angle at which of the display surface is observed causes diffracted light having different wavelengths to sequentially reach an observer's eyes in the display 10 of the present invention as well, which causes the observer to recognize that the display surface varies iridescently.

Next, here is the reason why the display 10 of the present invention displays a color with high chroma by virtue of scattered light.

Figure 17:
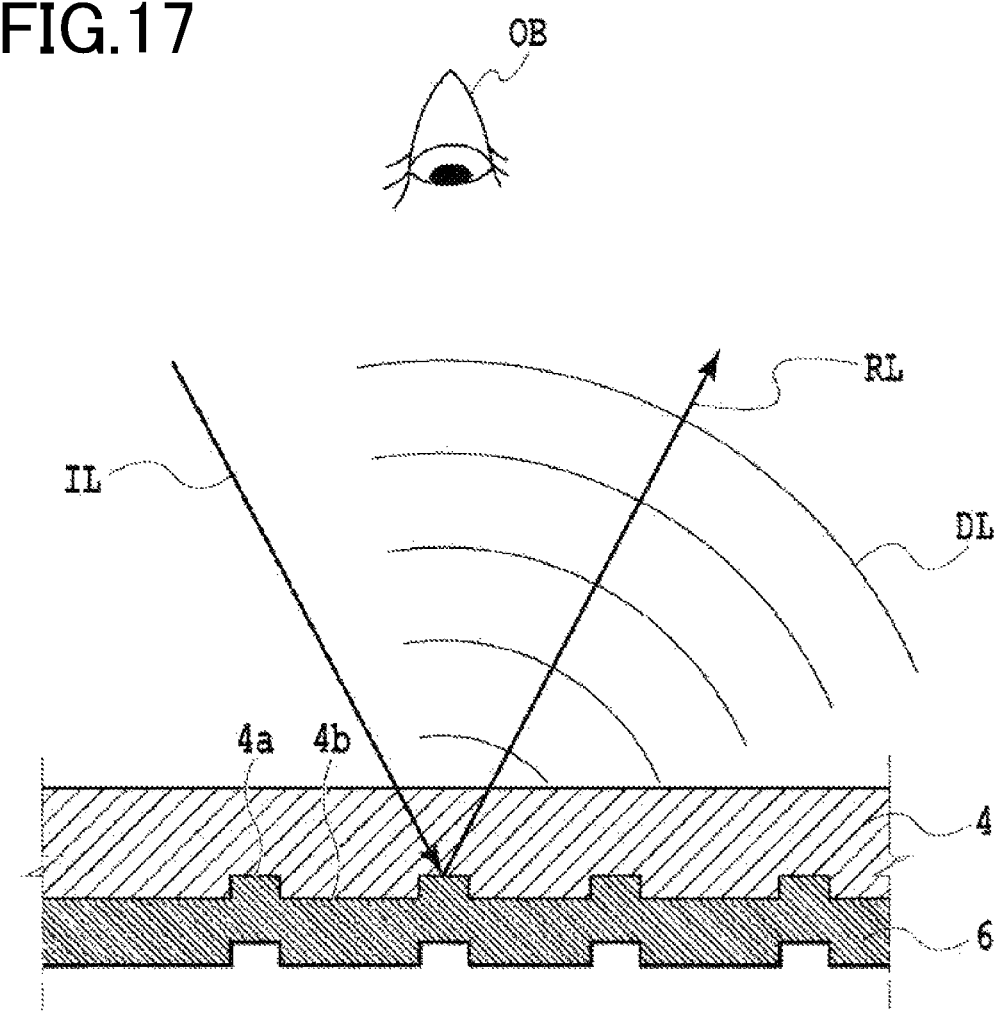
FIG. 17 is a schematic diagram illustrating how an uneven structure of a first region of an uneven-structure-forming layer emits scattered light.

FIG. 17 is a view schematically illustrating how the uneven structure in a first region R1 of the uneven-structure-forming layer 4 emits scattered light. In the example shown in FIG. 17, the uneven structure has the flat parts 4b and the concavities 4a. The concavities 4a are arranged such that the distances between the centers thereof are not to be equal. Incidence of illumination light on such irregularly arranged uneven structures causes emission of diffracted light in various directions, as well as emission of regularly reflected light. Hence some variation in the observation direction does not result in major color change of the display color. The observer then perceives a color according to the depth of the concavities or the height of the convexities. Described below is how the color perception occurs.

Figure 18:
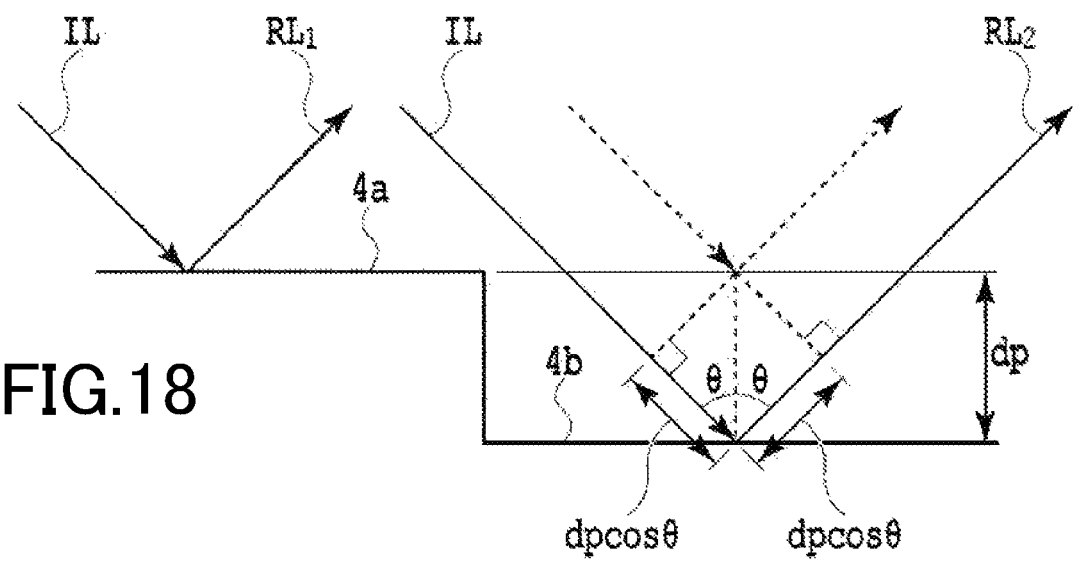
FIG. 18 is a schematic diagram illustrating how illumination light which is incident on an uneven structure provided at a first region and is reflected on a flat part and on the bottom surface of a concavity.

FIG. 18 is a view schematically illustrating how illumination light, which is incident on an uneven structure provided in a first region R1 and reflects at a flat part 4b and a bottom surface of a convexity 4a. As shown in FIG. 18, when illumination light IL, which is incident on the uneven structure at an angle θ, an optical path difference between a light $RL_1$ reflected by the bottom surface of the concavity 4a and the light $RL_2$ reflected by the flat part 4b is twice a product of a depth dp of the concavity 4a relative to the surface of the uneven-structure-forming layer 4, cos θ, and a refractive index n of the uneven-structure-forming layer 4. Hence, a phase difference between the light $RL_1$ and the light $RL_2$ is $4\pi n dp \cos \theta/\lambda$, which is the optical path difference 2ndp cos θ multiplied by $2\pi/\lambda$.

When the phase difference is an integer multiple of $2\pi$, the lights $RL_1$ and $RL_2$ create constructive interference. In this case, the uneven structure therefore emits specularly reflected light RL with high intensity and diffracted light DL with low intensity.

When the phase difference is equal to a sum of $2\pi$ multiplied by an integer and π, the lights $RL_1$ and $RL_2$ create destructive interference. In this case, the uneven structure therefore emits specularly reflected light RL with low intensity and diffracted light DL with high intensity.

At some extent of the depth of the concavities or the height of the convexities, light of a certain wavelength within the visible range creates constructive interference while light of another wavelength within the visible range creates destructive interference.

When the concavities have a uniform depth or the convexities have a uniform height as in the present invention, diffraction is less efficient in some wavelength region within the visible wavelength range than in the other wavelength regions.

Hence, when the uneven structure of a first region R1 is illuminated with illumination light, the observer perceives a particular color according to the depth of the concavities or the height of the convexities.

For example, assuming that diffraction efficiency of blue (a 460-nm wavelength) light is low, and red (a 630-nm wavelength) and green (a 540-nm wavelength) wavelength components of the diffracted light reaches the eyes of the observer at a time of observation of the first region R1 provided with concavities of a certain depth, yellow is observed. For example, assuming that diffraction efficiency of red light is low, and green and blue wavelength components of the diffracted light reaches the eyes of the observer at a time of observation of the first region R1 provided with convexities of another depth, cyan is observed.

In the example shown in FIG. 1, leveling out all the depths of the concavities 4a arranged in the character portions of "T", "O", and "P" makes it possible to display all the letters 8 in an identical structural color. Alternatively, arranging the concavities 4a having different depths for each letter 8 of "T", "O", and "P", makes it possible to display each letter in a different structural color. In addition, as shown in the current figure, dividing the letter "P" into "I" and "⊃" and arranging the concavities 4a each having a different depth for each character makes it possible to display one letter in different structural colors.

As described above, changing the observation angle causes the display 10 of the present invention to produce a color change caused by the periodic structure, while displaying a structural color whose color hardly changes, although the observation direction changes to some degree. As described above, the display 10 of the present invention provides both a color change depending on the observation angle, and a color change not much depending on the observation angle. Hence, the display 10 provides very special visual effects. As a result, the display 10 of the present invention exhibits improved anti-counterfeiting effects compared with a conventional display that only displays structural color.

(Method of Manufacturing the Display 10)

Next, an exemplary method of manufacturing the display 10 of the present invention will be described.

First, an uneven-structure-forming layer 4 having an uneven structure on one surface is formed. Forming the uneven-structure-forming layer 4 involves preparing a metallic stamper by use of photolithography as follows.

The first step is to apply a photosensitive resist material to a smooth substrate (a glass substrate is generally used) to form an evenly thick resist material layer. Examples of the material that can be used as the photosensitive resist material include a known positive or a negative type material. The next step is to draw a desired pattern on the resist material layer with a charged particle beam before developing this resist material layer to produce an uneven structure.

The following step is to use this structure as an original plate to prepare a metallic stamper by electroforming or other method. Electroforming is a kind of surface treatment technique for forming a metal film on this object by immersing in a predetermined aqueous solution the object to be electroformed and energizing the object by virtue of the reducing power of electrons. Such a method makes it possible to precisely duplicate a fine uneven structure provided on a surface of the original plate. Note that a surface of the object to be electroformed needs to be electrically conductive. A metal thin film should be provided in advance on a surface of the structure by a vapor phase deposition method such as sputtering or vacuum deposition before carrying out the electroforming because photosensitive resists are generally non-conductive.

Then, by using this stamper, the uneven structure is duplicated. More specifically, duplicating the uneven structure follows, for example, the following steps: first applying a thermoplastic resin or a photo curing resin on a transparent substrate 2 made of polycarbonate or polyester; then closely contacting the metal stamper with the coating film before heating or irradiating the resin layer in this state; and removing the metal stamper from the cured resin to produce an uneven-structure-forming layer 4, which has an uneven structure.

Photolithography is used as a method of manufacturing the original plate in the above description, but using a fine-tipped diamond bite or other cutting tool and etching to corrode a surface of metal and other material are also available as an alternative method. Such a method can directly process a surface of the metal plate, which makes it possible to directly prepare the metal stamper without having to form the metal stamper by electroforming and other method.

What to do next is to deposit aluminum and other metal or a dielectric into a single layer or multilayer by, for example, vapor deposition to form a reflecting layer 6 on the uneven-structure-forming layer 4. Preparing a reflecting layer 6 that only covers a part of the uneven-structure-forming layer 4, or a patterned reflecting layer 6 involves forming a reflecting layer 6 serving as a continuous film by, for example, the vapor phase deposition method before dissolving a part thereof with chemicals and the like. An alternative method of preparing the patterned reflecting layer 6 is to form a reflecting layer 6 serving as a continuous film before removing a part of the reflecting layer 6 from the uneven-structure-forming layer 4 by use of adhesive material that is more adhesive onto the reflecting layer 6 than onto the uneven-structure-forming layer 4. Further alternatively, the patterned reflecting layer 6 can be prepared through vapor phase deposition by use of a mask, or through a lift-off process.

The display 10 can be thus manufactured.

<Article with a Display>

The display 10 of the present invention described above can be used as an anti-counterfeiting label by being carried by printed objects and other articles. As described above, the display 10 provides special visual effects. In addition, it is hard to counterfeit the display 10. It is therefore hard to counterfeit or imitate an article with a display in which the display 10 is carried by the article itself.

Figure 19:
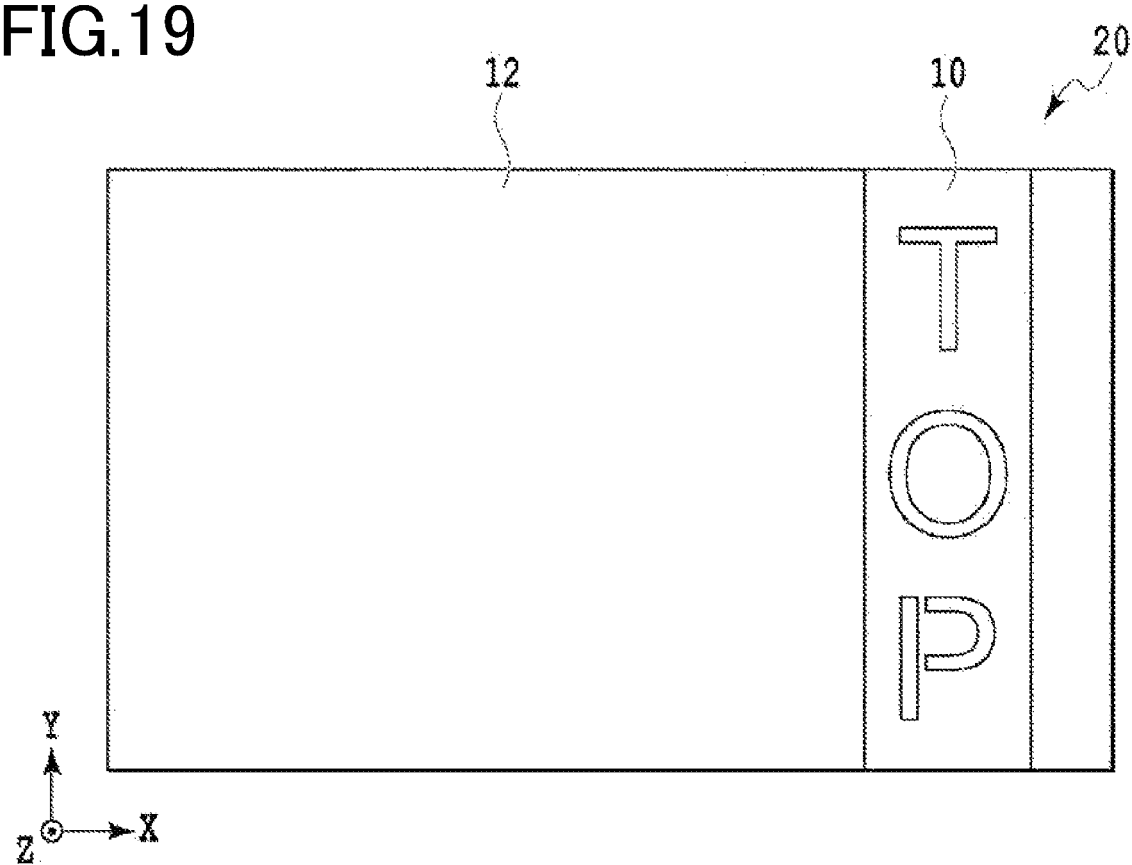
FIG. 19 is a schematic plan view illustrating an example of an article with a display of the present invention.

FIG. 19 is a schematic plan view illustrating an example of the article with a display of the present invention.

Examples of an article 12 to which the display 10 is attached include a card such as a magnetic card, an integrated circuit (IC) card, a wireless card, and an identification (ID) card, passports, and a valuable stock certificate such as a gift ticket and a stock certificate, and a paper currency. Alternatively, the article 12 may be a tag and a label to be attached to an article that should be confirmed as a genuine product. Other examples thereof may include a package or a part thereof that accommodates an article to be confirmed as a genuine product.

Examples of the substrate that can be used as a valuable stock certificate or paper currency include a paper substrate, a substrate made of a resin or the like.

The article 20 with a display may be an article with the display 10 being fixed to the substrate of the article 12 with an adhesive layer or a sticking layer therebetween. More specifically, the article 20 with a display may be an article with the display 10 being prepared in advance as an adhesive sticker (label), a transfer foil, or a hologram sheet, the display 10 being fixed to the substrate. The adhesive sticker (label) has a configuration in which an adhesive layer or a sticking layer is provided so as to be in contact with the reflecting layer 6 (a part from which the reflecting layer 6 is removed is the uneven-structure-forming layer 4). The transfer foil has a configuration in which a removable layer is provided between the substrate that constitutes the display 10 and the uneven-structure-forming layer and an adhesive layer or a sticking layer is provided so as to be in contact with the reflecting layer 6 (a part from which the reflecting layer 6 is removed is the uneven-structure-forming layer 4). Removing the substrate after pasting the transfer foil to the article 12 can transfer the display 10 to a surface of the article 12. The transfer foil may be stripe- or patch-shaped, and be applied to all over or a part of the article 12.

The display 10 can also be provided with a printed layer. The printed layer can produce a color that is relatively similar to the structural color developed by the display 10, while not providing an iridescent change. Hence, in the display 10 provided with the printed layer, no iridescent change occurs in an area where the printed layer is provided, but iridescent change does occur in a first area group provided with the uneven structure of the uneven-structure-forming layer 4. Taking advantage of this characteristic makes it possible to design a display 10 having an area not producing iridescent change and an area producing iridescent change, though these areas may be recognized to be printed images at first glance. Such a display 10 exhibits improved anti-counterfeiting effects. In addition, using several light sources as appropriate can determine whether or not a target article is authentic at a time of observation of the display 10. For example, in an display in which the first regions of the uneven-structure-forming layer 4 are arranged at a pitch of 30 μm-100 μm, the color of an image recognized as a printed image iridescently changes by use of an LED light when observed under a fluorescent light, which makes it possible to determine its authenticity. In addition, in a display in which the first regions are arranged at a pitch of 100 μm-300 μm, the color of an image recognized as a printed image iridescently changes by use of a laser light when observed under a fluorescent light, which makes it possible to determine its authenticity.

Further, in the display 10 provided with the printed layer, matching a hue of the displayed color caused by the printed layer with a hue of the structural color caused by the uneven structure of the uneven-structure-forming layer 4 further enhances the anti-counterfeiting effects.

Note that the printed layer may be provided as an adhesive sticker (label) or transfer foil after the display is attached or transferred to the article. When the display is transferred as a transfer foil, the printed layer can be formed on the removable layer.

When the article 12 has, for example, a printed layer on its substrate, the display 10 may be fixed on the printed layer of the substrate. Comparing optical effects of the display 10 with that of the printed layer enables the article with the display 20 to stand out the optical effects of the display 10.

When the display 10 is fixed to the substrate, such as when paper is used as the substrate, the display 10 may be watermarked in the paper and the paper may open at a location corresponding to the display 10. The display 10 may also be embedded in the article 12. In this case, the display 10 can be used as a thread.

The display 10 may be used for a purpose other than anti-counterfeiting. The display 10 can be used, for example, as a toy, learning material, an ornament or the like.

REFERENCE SIGNS LIST

2 . . . Substrate; 4 . . . Uneven-structure-forming layer; 4a . . . Concavity; 4b . . . Flat part; 6 . . . Reflecting layer; 10 . . . Display; 12 . . . Article; 20 . . . Article with display; R1 . . . First region; R2 . . . Second region; G, G1, G2, G3 . . . First region group

What is claimed is:

1. A display comprising:
an uneven-structure-forming layer having an uneven structure on one surface; and a reflecting layer that covers at least part of an unevenly structured surface of the uneven-structure-forming layer,
wherein the uneven-structure-forming layer includes a first region group including a plurality of first regions, each first region including a flat part and a plurality of convexities or a plurality of concavities, a top surface of each of the convexities or a bottom surface of each of the concavities is substantially parallel to a surface of the flat part;
for each of the first regions, the convexities of the plurality of convexities or the concavities of the plurality of the concavities are irregularly arranged on the flat part so that distances between the centers of adjacent convexities or concavities are not equal in at least one direction parallel to the flat part;
wherein the convexities have a uniform height, or the concavities have a uniform depth;
wherein the first regions within the first region group are periodically arranged in at least one direction parallel to the flat part_with a pitch of 1 μm-300 μm;
wherein each of the first regions is provided with an identical uneven structure that includes the plurality of convexities or the plurality of concavities and the flat part surrounding the plurality of convexities or the plurality of concavities, and
wherein the first region group further comprises a plurality of identical second regions, each of the second regions of the plurality of identical second regions has the same outer shape as each of the first regions of the plurality of the first regions, each second region includes a flat part and a plurality of convexities or a plurality of concavities, a top surface of each of the convexities or a bottom surface of each of the concavities being substantially parallel to a surface of the flat part,
in each of the second regions, the convexities of the plurality of convexities or the concavities of the plurality of the concavities are irregularly arranged on the flat part so that the distances between the centers of adjacent convexities or concavities are not equal in at least one direction parallel to the flat part of the second region,
the irregular arrangement of the convexities or the concavities is in the second regions is different from the irregular arrangement of the convexities or the concavities in the first regions, the flat parts of the second regions are parallel to the flat parts of the first regions;
the first regions and the second regions are periodically arranged in an alternating manner in at least one direction parallel to the flat parts.

2. An article with a display comprising the display of claim 1.

3. The display of claim 1, wherein distances between the centers of adjacent convexities or concavities are not equal in each of a first direction and a second direction, which is not parallel to the first direction, each of the first direction and the second direction is parallel to the flat part.

4. The display of claim 1, wherein distances between the centers of adjacent convexities or concavities are not equal in a first direction and distances between the centers of adjacent convexities or concavities are equal in a second direction, which is not parallel to the first direction, each of the first direction and the second direction is parallel to the flat part.

5. The display of claim 1, wherein each of the first regions within the first region group has a square outer shape, wherein the first regions within the first region group are periodically arranged in each of a first direction and a second direction, which is perpendicular to the first direction, with a pitch in each of the first direction and the second direction being from 1 µm to 300 µm; each of the first direction and the second direction is parallel to the flat part.

6. The display of claim 5, wherein the pitch in the first direction is the same as the pitch in the second direction.

7. The display of claim 1, wherein each of the first regions within the first region group has a rectangular outer shape, wherein the first regions within the first region group are periodically arranged in each of a first direction and a second direction, which is perpendicular to the first direction, with a first pitch in the first direction and a second pitch, which is not equal to the first pitch in the second direction, each of the first pitch and the second pitch being from 1 µm to 300 µm; each of the first direction and the second direction is parallel to the flat part; the first pitch and the second pitch correspond to dimensions of the rectangular outer shape in the first direction and the second direction respectively.

8. The display of claim 1, wherein an outer shape of each of the first regions within the first region group is an equilateral hexagon, so that the first regions within the first region group form a hexagonal honeycomb structure.

9. The display of claim 1, wherein the first region group further comprises a plurality of identical flat regions, each of the flat regions of the plurality of identical flat regions has the same outer shape as each of the first regions of the plurality of the first regions, each of the flat regions of the plurality of identical flat regions is parallel to the flat part of each of the first regions of the plurality of the first regions, the first regions and the flat regions are periodically arranged in an alternating manner in at least one direction parallel to the flat part.

10. The display of claim 9, wherein the first regions and the flat regions are periodically arranged in an alternating manner in a first direction parallel to the flat part, the first regions are arranged adjacent to each other in a second direction, which is parallel to the flat part but is perpendicular to the first direction; the flat regions are arranged adjacent to each other in the second direction.

11. The display of claim 9, wherein the first regions and the flat regions are periodically arranged in an alternating manner in each of a first direction and a second direction, which is perpendicular to the first direction, each of the first direction and the second direction is parallel to the flat part.

12. The display of claim 1, wherein the first regions and the second regions are periodically arranged in an alternating manner in a first direction parallel to the flat parts, the first regions are arranged adjacent to each other in a second direction, which is parallel to the flat parts but is perpendicular to the first direction; the second regions are arranged adjacent to each other in the second direction.

13. The display of claim 1, wherein the first regions and the second regions are periodically arranged in an alternating manner in each of a first direction and a second direction, which is perpendicular to the first direction, each of the first direction and the second direction is parallel to the flat parts.

14. A display comprising:
an uneven-structure-forming layer having an uneven structure on one surface; and
a reflecting layer that covers at least part of an unevenly structured surface of the uneven-structure-forming layer, wherein the uneven-structure-forming layer includes a first region group including a plurality of first regions, each first region including a flat part and a plurality of convexities or a plurality of concavities, a top surface of each of the convexities or a bottom surface of each of the concavities is substantially parallel to a surface of the flat part;
for each of the first regions, the convexities of the plurality of convexities or the concavities of the plurality of the concavities are irregularly arranged on the flat part so that distances between the centers of adjacent convexities or concavities are not equal in at least one direction parallel to the flat part;
wherein the convexities have a uniform height, or the concavities have a uniform depth;
wherein the first regions within the first region group are periodically arranged in at least one direction parallel to the flat part with a pitch of 1 µm-300 µm;
wherein each of the first regions is provided with an identical uneven structure that includes the plurality of convexities or the plurality of concavities and the flat part surrounding the plurality of convexities or the plurality of concavities, wherein each of the first regions within the first region group has a square outer shape, wherein the first regions within the first region group are periodically arranged in each of a first direction and a second direction, which is perpendicular to the first direction, with a pitch in each of the first direction and the second direction being from 1 µm to 300 µm; each of the first direction and the second direction is parallel to the flat part; and
wherein the pitch in the first direction is the same as the pitch in the second direction.

* * * * *